US011861131B2

(12) United States Patent
Yang et al.

(10) Patent No.: US 11,861,131 B2
(45) Date of Patent: Jan. 2, 2024

(54) DISPLAY DEVICE

(71) Applicant: SAMSUNG DISPLAY CO., LTD., Yongin-si (KR)

(72) Inventors: Sung Jin Yang, Cheonan-si (KR); Hyun Sik Park, Cheonan-si (KR); Chun Gi You, Anyang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/151,927

(22) Filed: Jan. 9, 2023

(65) Prior Publication Data

US 2023/0161448 A1 May 25, 2023

Related U.S. Application Data

(63) Continuation of application No. 17/153,763, filed on Jan. 20, 2021, now Pat. No. 11,550,441.

(30) Foreign Application Priority Data

Mar. 24, 2020 (KR) .......................... 10-2020-0035759

(51) Int. Cl.
G06F 3/044 (2006.01)
G06F 3/041 (2006.01)

(52) U.S. Cl.
CPC .......... *G06F 3/0448* (2019.05); *G06F 3/0412* (2013.01); *G06F 3/0443* (2019.05);
(Continued)

(58) Field of Classification Search
CPC .. G06F 3/0446; G06F 3/0448; G06F 3/04164; G06F 3/0443; G06F 3/0412; G06F 2203/04111
(Continued)

(56) References Cited

U.S. PATENT DOCUMENTS

2019/0079622 A1* 3/2019 Choi .................... G06F 3/0446
2020/0004362 A1 1/2020 Yang et al.
2022/0077193 A1* 3/2022 Shin .................... G06F 3/0412

FOREIGN PATENT DOCUMENTS

KR 10-1082293 B1 11/2011
KR 10-2014-0044651 A 4/2014
(Continued)

*Primary Examiner* — Mark Edwards
(74) *Attorney, Agent, or Firm* — Lewis Roca Rothgerber Christie LLP

(57) ABSTRACT

Provided is a display device including a display unit including a display area, a transmitting portion surrounded by the display area, and a non-display area surrounding the display area, and a touch sensing unit having a transmissive area, dummies overlapping the transmitting portion and surrounding the transmissive area, and a touch sensor area surrounding the dummies and including first touch electrodes, and second touch electrodes respectively between the first touch electrodes, connected in a first direction, and spaced apart in a second direction perpendicular to the first direction, wherein the dummies include a main dummy surrounding the transmissive area, and at least one sub-dummy surrounding the main dummy, and wherein an outermost sub-dummy of the at least one sub-dummy that is at an outermost position of the dummies includes a first cut corresponding to a gap between adjacent first and second touch electrodes among the first and second touch electrodes.

20 Claims, 26 Drawing Sheets

(52) U.S. Cl.
CPC ........ *G06F 3/0446* (2019.05); *G06F 3/04164* (2019.05); *G06F 2203/04111* (2013.01)

(58) Field of Classification Search
USPC ........................................................ 345/173
See application file for complete search history.

(56) References Cited

FOREIGN PATENT DOCUMENTS

| | | |
|---|---|---|
| KR | 10-2017-0066767 A | 6/2017 |
| KR | 10-1957156 B1 | 3/2019 |
| KR | 10-1976735 B1 | 5/2019 |
| KR | 10-2019-0085202 A | 7/2019 |

* cited by examiner

DISPLAY DEVICE

CROSS-REFERENCE TO RELATED APPLICATIONS

This application is a continuation of U.S. patent application Ser. No. 17/153,763, filed Jan. 20, 2021, which claims priority to and the benefit of Korean Patent Application No. 10-2020-0035759, filed Mar. 24, 2020, the entire content of both of which is incorporated herein by reference.

BACKGROUND

1. Field

The present disclosure relates to a display device.

2. Description of the Related Art

Electronic devices that provide images to a user, such as a smart phone, a tablet PC, a digital camera, a laptop computer, a navigation device, and a television (TV), include a display device for displaying the images. Such a display device includes a display panel for generating and displaying images and various input means.

Recently, a touch sensing unit that recognizes a touch input has been widely employed for the input means of a display device for a smartphone or a tablet PC. The touch sensing unit determines whether a user's touch input is received, and, if any touch input is received, finds the coordinates of the position of the touch input.

The touch sensing unit may include first touch electrodes electrically connected in a first direction, second touch electrodes electrically connected in a second direction crossing the first direction, first touch lines connected to the first touch electrodes, and second touch lines connected to the second touch electrodes. There may be undesirable coupling between the first touch electrodes and the second touch electrodes. As a result, the sensitivity of the touch sensing unit may deteriorate, or the touch sensing unit may otherwise not work.

SUMMARY

Aspects of the present disclosure provide a display device that includes a transmissive area surrounded by at least one first touch electrode and at least one second touch electrode, and dummies surrounding the transmissive area to thereby reduce or prevent the likelihood of undesirable coupling between at least one first touch electrode and at least one second touch electrode by virtue of the dummies.

It should be noted that the present disclosure is not limited to the above-mentioned aspects, and that other aspects of the present disclosure will be apparent to those skilled in the art from the following descriptions.

According to some embodiments of the present disclosure, a display device including a display unit including a display area having a plurality of pixels, a transmitting portion surrounded by the display area, and a non-display area surrounding the display area, and a touch sensing unit having a transmissive area overlapping the transmitting portion, dummies overlapping the transmitting portion and surrounding the transmissive area, and a touch sensor area surrounding the dummies and including first touch electrodes arranged in a first direction and a second direction perpendicular to the first direction, and second touch electrodes respectively between the first touch electrodes, connected in the first direction, and spaced apart from one another in the second direction, wherein the dummies include a main dummy surrounding the transmissive area, and at least one sub-dummy surrounding the main dummy, and wherein an outermost sub-dummy of the at least one sub-dummy that is at an outermost position of the dummies includes a first cut corresponding to a gap between adjacent first and second touch electrodes among the first and second touch electrodes.

The first cut may be adjacent the gap between the adjacent first and second touch electrodes.

The touch sensing unit may further include a base member supporting the dummies, wherein the dummies are at a layer between the base member and the first and second touch electrodes.

The touch sensing unit may further include an electrode dummy between the adjacent first and second touch electrodes.

The first cut may be spaced apart from the electrode dummy, the electrode dummy being between the first cut and one of the adjacent first and second touch electrodes.

The outermost sub-dummy may further include second cuts respectively corresponding to respective gaps between the electrode dummy and the first and second touch electrodes that directly faces the electrode dummy.

The touch sensing unit may further include a contact dummy that surrounds the outermost sub-dummy, and comes in contact with the first touch electrode or the second touch electrode that is adjacent the outermost sub-dummy among the first and second touch electrodes.

A width of the contact dummy may be greater than a width of the outermost sub-dummy in a plan view.

The contact dummy may include a seventh cut overlapping the gap between the adjacent first and second touch electrodes in a plan view.

The touch sensing unit may further include an electrode dummy between the adjacent first and second touch electrodes, wherein a part of the outermost sub-dummy is surrounded by the contact dummy, and another part thereof is surrounded by the electrode dummy.

Both ends of the contact dummy may correspond to the second cuts, respectively.

The at least one sub-dummy may include a first sub-dummy surrounding the main dummy, a second sub-dummy surrounding the first sub-dummy, and a third sub-dummy as the outermost sub-dummy surrounding the second sub-dummy and facing the adjacent first and second touch electrodes.

The second sub-dummy may include a third cut adjacent the first cut.

The gap between the adjacent first and second touch electrodes, the first cut, and the third cut may be aligned in a straight imaginary line.

The second sub-dummy may include a fourth cut overlapping a first axis extending in the first direction and passing through a center of the transmissive area, or overlapping a second axis extending in the second direction and passing through the center of the transmissive area.

The first sub-dummy may include a fifth cut adjacent the third cut.

The gap between the adjacent first and second touch electrodes, the first cut, the third cut, and the fifth cut may be aligned in a straight imaginary line.

The first sub-dummy may include a sixth cut overlapping a third axis extending in a third direction that is between the first direction and the second direction and passing through a center of the transmissive area, or a fourth axis extending in a fourth direction between an opposite direction to the first direction and the second direction and passing through the center of the transmissive area.

The touch sensing unit may include a touch island electrode between adjacent ones of the first touch electrodes that are adjacent in the second direction, and connection electrodes connecting the adjacent ones of the first touch electrodes with the touch island electrode.

The touch island electrode may be in a same layer as the first touch electrodes and the second touch electrodes, wherein the connection electrodes are in a same layer as the dummies.

According to some embodiments of the present disclosure, a display device includes a display unit including a display area having a plurality of pixels, a first non-display area surrounded by the display area, a transmitting portion surrounded by the first non-display area and having an open side, and a second non-display area surrounding the display area, and a touch sensing unit having a transmissive area overlapping the transmitting portion, dummies overlapping the first non-display area and surrounding the transmissive area, and a touch sensor area surrounding the dummies and including a base member, first touch electrodes arranged in a first direction and in a second direction that is perpendicular to the first direction on the base member, and second touch electrodes between the first touch electrodes, connected in the first direction, and spaced apart from one another in the second direction, wherein the dummies include a main dummy directly surrounding the transmissive area, and at least one sub-dummy surrounding the main dummy, and wherein an outermost sub-dummy of the at least one sub-dummy that is at an outermost position of the dummies includes a cut corresponding to a gap between adjacent first and second touch electrodes among the first and second touch electrodes.

According to some embodiments of the present disclosure, a sub-dummy located at the outermost position of dummies may include a cut in line with the gap between directly adjacent first and second touch electrodes among a plurality of first and second touch electrodes. In this manner, even if an unintended coupling occurs between the first touch electrodes or the second touch electrodes and the dummies, the dummies associated with the first touch electrodes and the second touch electrodes are electrically insulated therefrom. As a result, it is possible to reduce or prevent the occurrence of undesirable coupling between the first and second touch electrodes, and to improve the sensitivity and reliability of the touch sensing unit.

It should be noted that aspects of the present disclosure are not limited to those described above and other aspects of the present disclosure will be apparent to those skilled in the art from the following descriptions.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION

Figure 1:
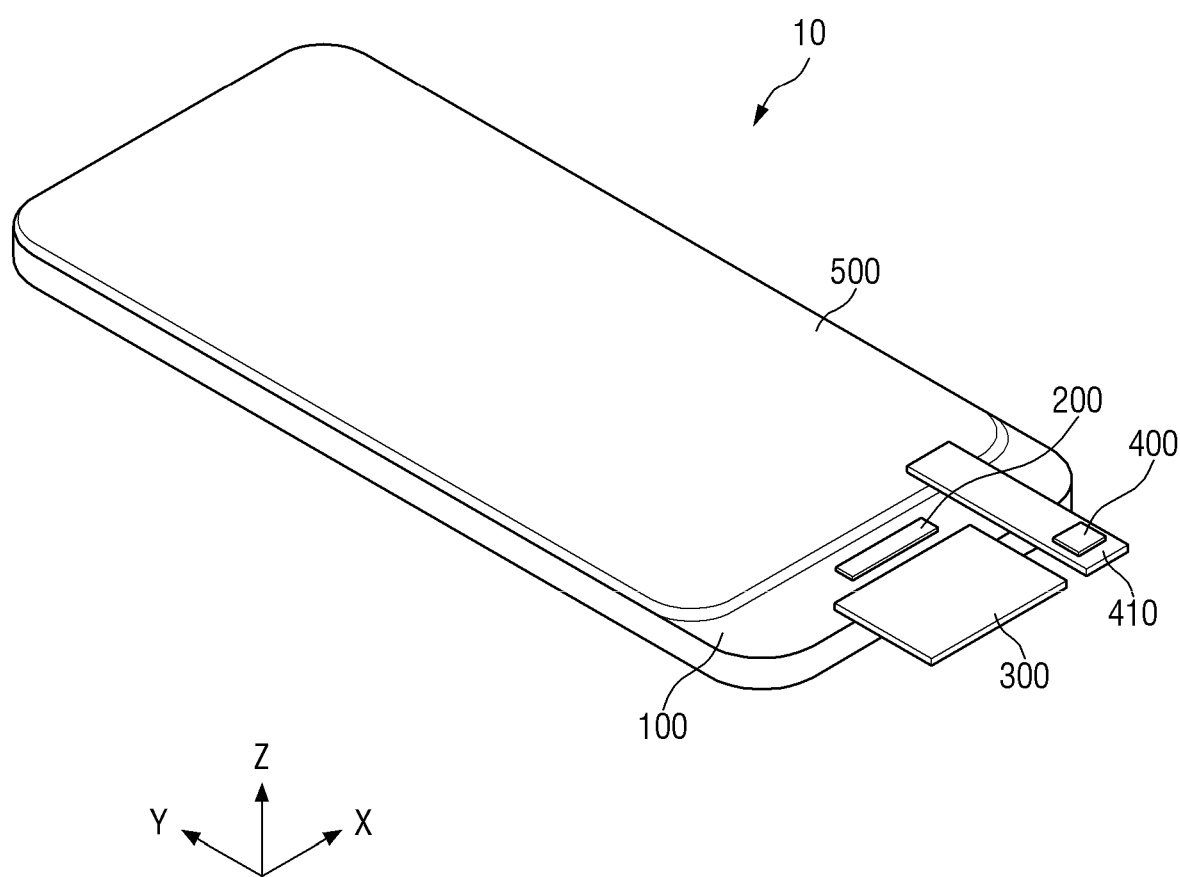
FIG. 1 is a perspective view showing a display device according to some embodiments of the present disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to other element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" may encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
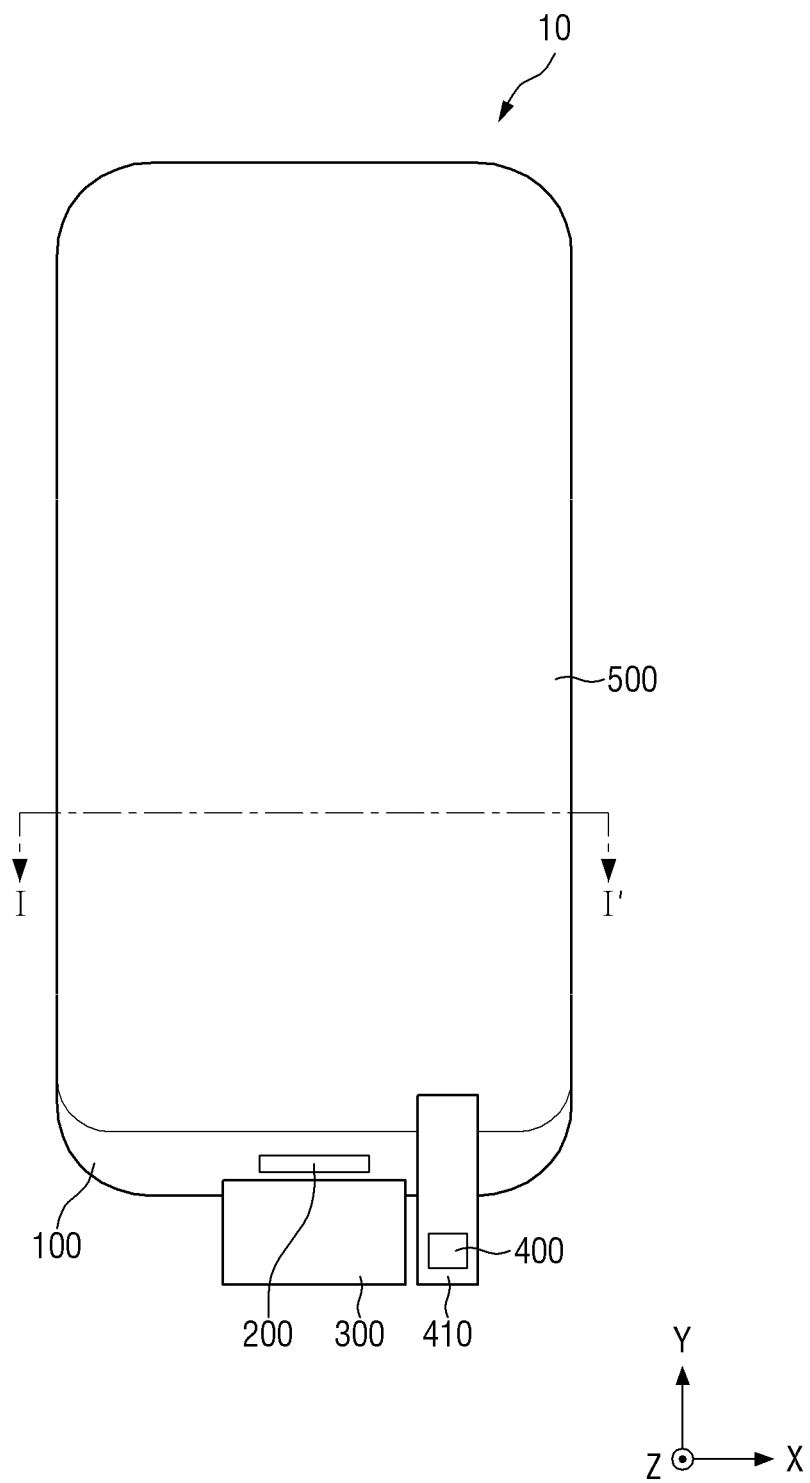
FIG. 2 is a plan view showing a display device according to some embodiments of the present disclosure.

FIG. 1 is a perspective view showing a display device according to some embodiments of the present disclosure, and FIG. 2 is a plan view showing a display device according to some embodiments of the present disclosure.

As used herein, the terms "above," "top" and "upper surface" refer to the upper side of the display device, i.e., the side indicated by the arrow in the z-axis direction, whereas the terms "below," "bottom" and "lower surface" refer to the lower side of the display device, i.e., the opposite side in the z-axis direction. As used herein, the terms "left," "right," "upper" and "lower" sides indicate relative positions when the display device is viewed from the top. For example, the "left side" refers to the opposite side indicated by the arrow of the x-axis direction, the "right side" refers to the side indicated by the arrow of the x-axis direction, the "upper side" refers to the direction indicated by the arrow of the y-axis direction, and the "lower side" refers to the opposite side indicated by the arrow of the y-axis direction. Further, in this specification, the phrase "on a plane," or "plan view," means viewing a target portion from the top, and the phrase "on a cross-section" means viewing a cross-section formed by vertically cutting a target portion from the side.

Referring to FIGS. 1 to 2, a display device 10 may be used for displaying moving images or still images. The display device 10 may be used as the display screen of portable electronic devices, such as a mobile phone, a smart phone, a tablet PC, a smart watch, a watch phone, a mobile communications terminal, an electronic notebook, an electronic book, a portable multimedia player (PMP), a navigation device and an ultra-mobile PC (UMPC), as well as the display screen of various products such as a television, a notebook, a monitor, a billboard, and products related to the Internet of Things (IoT).

The display device 10 may have a rectangular shape when viewed from the top (e.g., in a plan view). For example, the display device 10 may have a rectangular shape having shorter sides in the first direction (x-axis direction) and longer sides in the second direction (y-axis direction) when viewed from the top. The corners where the shorter sides in the first direction (x-axis direction) meet the longer sides in the second direction (y-axis direction) may be a substantially right angle, or may be rounded to have a curvature (e.g., a predetermined curvature). The shape of the display device 10 when viewed from the top is not limited to a rectangular shape, but may be formed in another polygonal shape, a circular shape, or an elliptical shape. For example, the display device 10 may be formed flat, but the present disclosure is not limited thereto. For another example, the display device 10 may be formed to bend (e.g., to bend with a predetermined curvature).

The display device 10 may include a display unit 100, a display driver 200, a display circuit board 300, a touch driver 400, a touch circuit board 410, and a touch sensing unit 500.

The display unit 100 may include a display area having pixels for displaying images, and a non-display area around the display area. The display area of the display unit 100 may emit light from a plurality of emission areas (or a plurality of open areas), respectively. For example, the display unit 100 may include a pixel circuit such as a switching element, a pixel-defining layer defining emission areas of the display area, and a self-light-emitting element.

For example, the self-light-emitting element may include at least one of an organic light-emitting diode, a quantum-dot light-emitting diode, an inorganic-based micro light-emitting diode (e.g., micro LED), and an inorganic-based nano light-emitting diode (e.g., nano LED). In the following description, the self-light-emitting element is an organic light-emitting diode as an example.

The non-display area of the display unit 100 may include display electrode pads located on one edge of the substrate. The display electrode pads may be electrically connected to the display circuit board 300. The display unit 100 will be described in detail with reference to FIGS. 3A and 4.

The display driver 200 may output signals and voltages for driving the display unit 100. The display driver 200 may supply data voltages to the data lines. The display driver 200 may provide a supply voltage to a power line, and may supply scan control signals to the scan driver. The display driver 200 may be implemented as an integrated circuit (IC) and may be attached to the display unit 100 by a chip-on-glass (COG) technique, a chip-on-plastic (COP) technique, or ultrasonic bonding. For example, the display driver 200 may be attached on the exposed part of the display unit 100 that is not covered by the touch sensing unit 500. For another example, the display driver 200 may be attached to the display circuit board 300.

The display circuit board 300 may be attached on the display electrode pads of the display unit 100 using an anisotropic conductive film (ACF). Accordingly, lead lines of the display circuit board 300 may be electrically connected to the display electrode pads of the display unit 100. The display circuit board 300 may be a flexible printed circuit board (FPCB), a printed circuit board (PCB), or a flexible film such as a chip-on-film (COF).

The touch driver 400 may be connected to touch electrodes of the touch sensing unit 500. The touch driver 400 may apply touch driving signals to the touch electrodes of the touch sensing unit 500, and may measure capacitances of the touch electrodes. For example, the touch driving signals may have driving pulses. The touch driver 400 may not only determine whether a touch is input based on the capacitances of the touch electrodes, but also may calculate touch coordinates of the position where the touch is input. The touch driver 400 may be implemented as an integrated circuit (IC), and may be mounted on the touch circuit board 410.

The touch circuit board 410 may be attached onto the touch electrode pads of the touch sensing unit 500 using an anisotropic conductive film. Accordingly, the lead lines of the touch circuit board 410 may be electrically connected to the touch electrode pads of the touch sensing unit 500. The touch circuit board 410 may be a flexible printed circuit board, a printed circuit board, or a flexible film such as a chip-on film.

The touch sensing unit 500 may be located on the display unit 100. The touch sensing unit 500 may have a rectangular shape having the shorter sides in the first direction (x-axis direction) and the longer sides in the second direction (y-axis direction) when viewed from the top. The corners where the shorter sides in the first direction (x-axis direction) meet the longer sides in the second direction (y-axis direction) may be a right angle, or may be rounded (e.g., rounded with a predetermined curvature). For example, the shape of the touch sensing unit 500 when viewed from the top is not limited to a rectangular shape, but may be formed in other polygonal shapes, a circular shape, or an elliptical shape. The shape of the touch sensing unit 500 may be similar to the shape of the display unit 100 when viewed from the top.

The touch sensing unit 500 may be, but is not limited to being, flat. The touch sensing unit 500 may include curved portions formed at left and right ends thereof. The curved portions may have a constant curvature or varying curvatures. In addition, the touch sensing unit 500 may be formed to be flexible so that it may be curved, bent, folded or rolled, like the display unit 100.

The touch sensing unit 500 may include touch electrodes that are located in a touch sensor area, and that may detect a user's touch, and may also include touch electrode pads that are located in a touch peripheral area around the touch sensor area. The touch electrode pads may be formed on the touch sensing unit 500 at one edge of the touch sensing unit 500 to be electrically connected to the touch circuit board 410.

The touch sensing unit 500 will be described in detail with reference to FIGS. 3A and 5. Although the touch sensing unit 500 is a touch panel separated from the display unit 100 in the example shown in FIGS. 1 and 2, the present disclosure is not limited thereto.

Figure 3A:
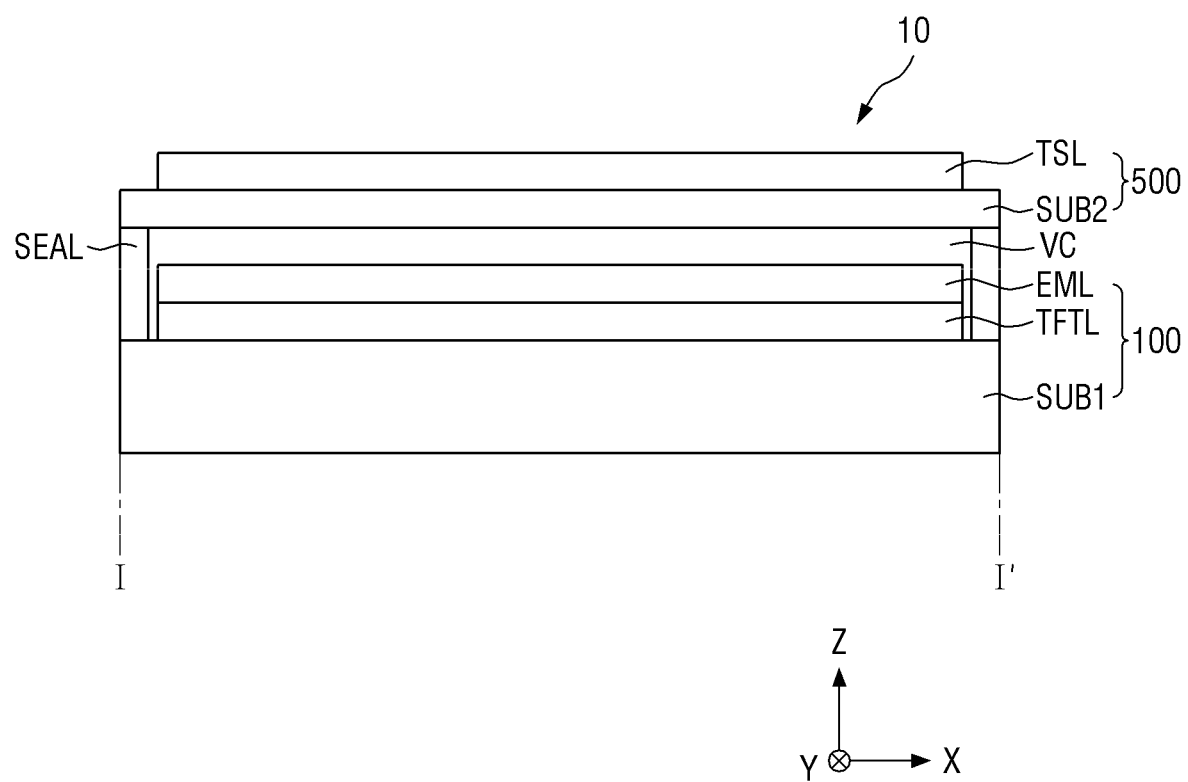
FIG. 3A is an example of a cross-sectional view taken along the line I-I' of FIG. 2.

FIG. 3A is an example of a cross-sectional view taken along the line I-I' of FIG. 2.

Referring to FIG. 3A, the display device 10 may include a display unit 100, a touch sensing unit 500, and a sealing member SEAL that attaches the display unit 100 to the touch sensing unit 500.

The display unit 100 may include a first substrate SUB1, a thin-film transistor layer TFTL, and an emission material layer EML.

The first substrate SUB1 may be a base substrate or a base member, and may be made of an insulating material such as a polymer resin. For example, the first substrate SUB1 may be a rigid substrate. For another example, the first substrate SUB1 may be a flexible substrate that may be bent, folded, or rolled. When the substrate SUB is a flexible substrate, it may be made of, but is not limited to, polyimide (PI).

Figure 4:
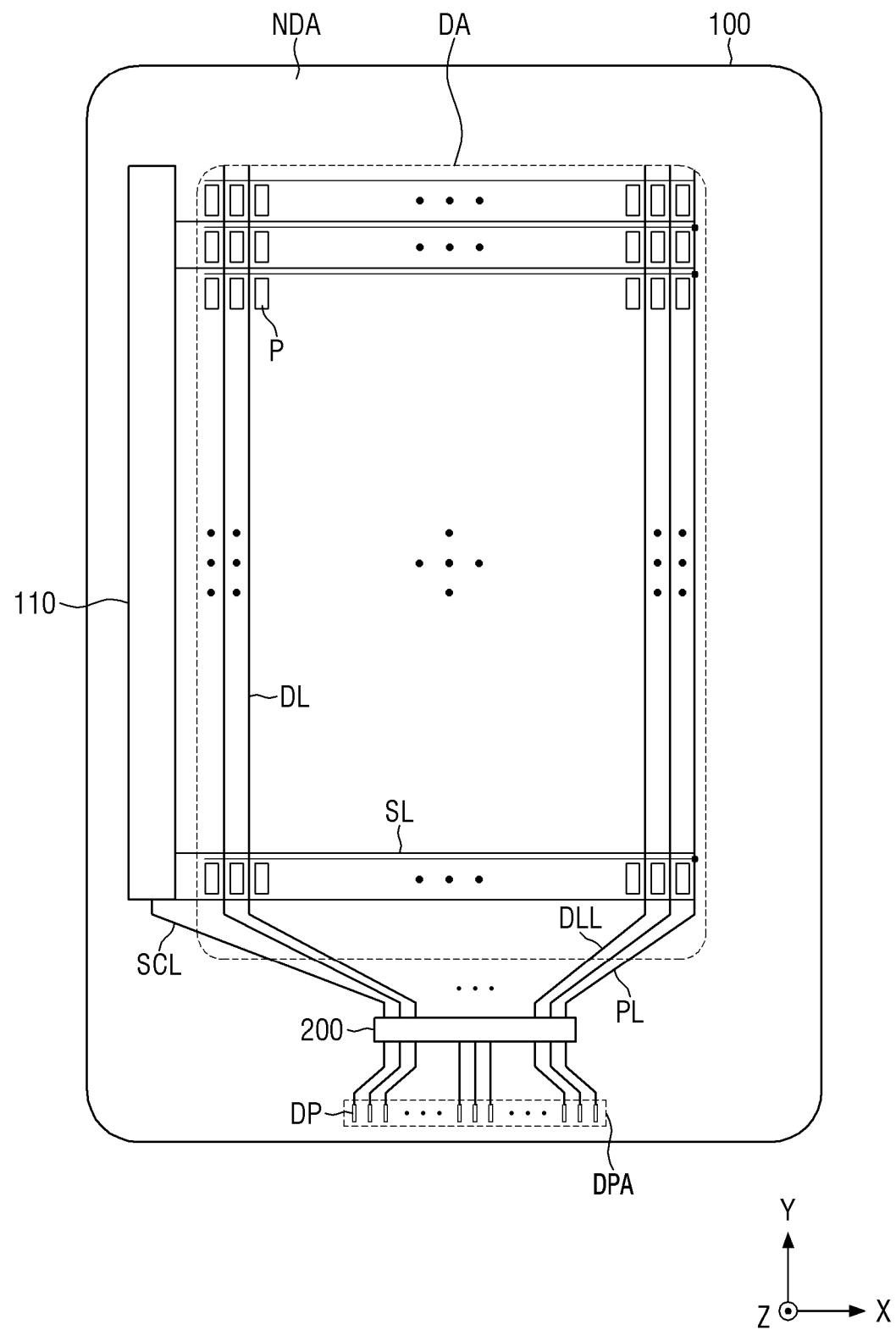
FIG. 4 is a plan view showing the display unit shown in FIG. 3A.

The thin-film transistor layer TFTL may be located on the first substrate SUB1. The thin-film transistor layer TFTL may include scan lines, data lines, power lines, scan control lines, data connection lines for connecting the display driver 200 with data lines, pad connection lines for connecting the display driver 200 with the display electrode pads, etc., as well as thin-film transistors forming the pixel circuits of the pixels. Each of the thin-film transistors may include a gate electrode, a semiconductor layer, a source electrode, and a drain electrode. When the scan driver 110 is formed in the non-display area NDA of the display unit 100, as shown in FIG. 4, the scan driver 110 may include thin-film transistors.

The thin-film transistor layer TFTL may be located in the display area and the non-display area. For example, the thin-film transistors in the pixels, the scan lines, the data lines, and the power supply lines on the thin-film film transistor layer TFTL may be located in the display area DA. The scan control lines, the data connection lines, and the pad connection lines of the thin-film transistor layer TFTL may be located in the non-display area.

The emission material layer EML may be located on the thin-film transistor layer TFTL. The emission material layer EML may include pixels in each of which a first electrode, an emissive layer, and a second electrode are stacked on one another sequentially to be able to emit light, and a pixel-defining layer for defining the pixels. The pixels on the emission material layer EML may be located in the display area DA.

For example, the emissive layer may be an organic emissive layer containing an organic material. The emissive layer may include a hole transporting layer, an organic light-emitting layer and an electron transporting layer. When a voltage is applied to the first electrode, while a cathode voltage is applied to the second electrode, through the thin-film transistors on the thin-film transistor layer TFTL, then the holes and electrons may move to the organic light-emitting layer through the hole transporting layer and the electron transporting layer, respectively, such that they combine in the organic light-emitting layer to emit light. For example, the first electrode may be an anode electrode, while the second electrode may be a cathode electrode.

For example, an air gap VC may be formed between the display unit 100 and the touch sensing unit 500. During a process of attaching the display unit 100 to the touch sensing unit 500 through the sealing member SEAL, the air gap VC may be formed between the display unit 100 and the touch sensing unit 500.

For another example, a filling layer may be located between the display unit 100 and the touch sensing unit 500. During the process of attaching the display unit 100 to the touch sensing unit 500 through the sealing member SEAL, the filling layer may be injected between the display unit 100 and the touch sensing unit 500. The filling layer may be, but is not limited to, an epoxy filling film or a silicon filling film.

The touch sensing unit 500 may include a second substrate SUB2 and a touch sensor layer TSL.

The second substrate SUB2 may be a base substrate or a base member, and may be made of an insulating material such as a polymer resin. For example, the second substrate SUB2 may be a rigid substrate. When the second substrate SUB2 is a rigid substrate, the second substrate SUB2 may include, but is not limited to, a glass material or a transparent metal material.

The touch sensor layer TSL may be located on the second substrate SUB2. The touch sensor layer TSL may include touch electrodes for sensing a user's touch by capacitive sensing, touch electrode pads, and touch signal lines for connecting the touch electrode pads with the touch electrodes. For example, the touch sensor layer TSL may sense a user's touch by self-capacitance sensing or mutual capacitance sensing.

The touch electrodes of the touch sensor layer TSL may be located in the touch sensor area overlapping the display area of the display unit 100. The touch signal lines and the touch electrode pads of the touch sensor layer TSL may be located in a touch peripheral area overlapping the non-display area of the display unit 100.

For example, a polarizing film and a cover window may be additionally located on the touch sensor layer TSL. The polarizing film may be located on the touch sensor layer TSL, and the cover window may be located on the polarizing film by an adhesive member.

The adhesive member SEAL may be interposed between the edge of the first substrate SUB1 and the edge of the second substrate SUB2 in the non-display area. The sealing member SEAL may be located along the edges of the first substrate SUB1 and the second substrate SUB2 in the non-display area to seal the air gap VC. The first substrate SUB1 and the second substrate SUB2 may be coupled with each other by the sealing member SEAL. For example, the sealing member SEAL may be, but is not limited to, a frit adhesive layer, an ultraviolet curable resin, or a thermosetting resin.

Figure 3B:
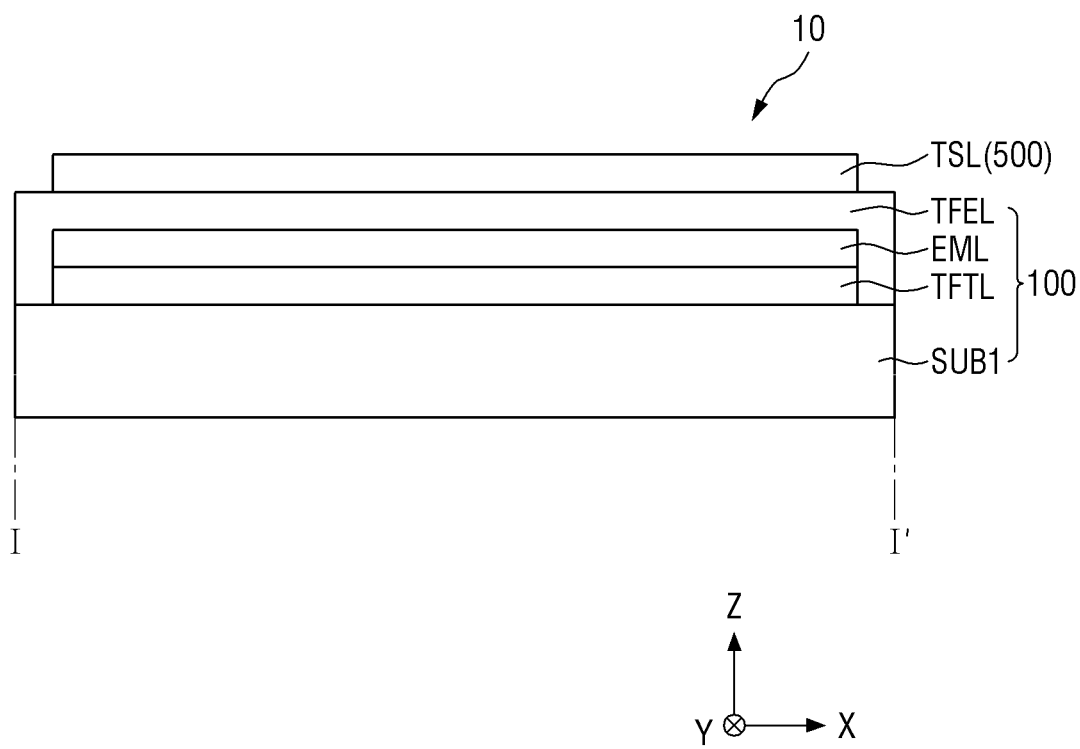
FIG. 3B is another example of a cross-sectional view taken along the line I-I' of FIG. 2.

FIG. 3B is another example of a cross-sectional view taken along the line I-I' of FIG. 2. The display device of FIG. 3B may further include an encapsulation layer TFEL that encapsulates the display unit 100 while the second substrate SUB2 of the display device of FIG. 3A is omitted. In the following description, the same elements as those described above will be briefly described or will not be described.

Referring to FIG. 3B, the display device 10 may include a display unit 100 and a touch sensing unit 500.

The display unit 100 may include a first substrate SUB1, a thin-film transistor layer TFTL, an emission material layer EML and an encapsulation layer TFEL.

The first substrate SUB1 may be a base substrate or a base member, and may be made of an insulating material, such as a polymer resin. The thin-film transistor layer TFTL may be located on the first substrate SUB1. The emission material layer EML may be located on the thin-film transistor layer TFTL.

The encapsulation layer TFEL may be located on the emission material layer EML to cover a plurality of light-emitting elements. The encapsulation layer TFEL may prevent oxygen or moisture from permeating into the light-emitting elements.

The touch sensing unit 500 may be located on the encapsulation layer TFEL, and may include a touch sensor layer TSL.

The touch sensor layer TSL may be located on the encapsulation layer TFEL. The touch sensor layer TSL may include touch electrodes for sensing a user's touch by capacitive sensing, touch electrode pads, and touch signal lines for connecting the touch electrode pads with the touch electrodes. For example, the touch sensor layer TSL may sense a user's touch by self-capacitance sensing or mutual capacitance sensing.

FIG. 4 is a plan view showing the display unit shown in FIG. 3A.

Referring to FIG. 4, the display unit 100 may include a display area DA where pixels are located to display images, and a non-display area NDA that is the peripheral area of the display area DA. The non-display area NDA may be defined as the area from the outer side of the display area DA to the edge of the display unit 100.

The scan lines SL, the data lines DL, the power line PL and the pixels P may be located in the display area DA. The scan lines SL may be arranged to extend in the first direction (x-axis direction), while the data lines DL may be arranged to extend in the second direction (y-axis direction) intersecting the first direction. The power lines PL may include at least one vertical line in parallel with the data lines DL in the second direction, and a plurality of horizontal lines branching off from the at least one vertical line in the first direction.

Each of the pixels P may be connected to at least one scan line SL, data line DL, and power line PL. Each of the pixels P may include thin-film transistors including a driving transistor and at least one switching transistor, a light-emitting element, and a capacitor. When a scan signal is applied from a scan line SL, corresponding ones of the pixels P receive a data voltage of a data line DL, and supply a driving current to the light-emitting element according to the data voltage applied to the gate electrode, so that light is emitted.

The display unit 100 may include a scan driver 110 located in a non-display area NDA, a scan control line SCL, data connection lines DLL, and pad connection lines. In addition, the display driver 200 may be located in the non-display area NDA of the display unit 100.

The scan driver 110 may be connected to the display driver 200 through at least one scan control line SCL. The scan driver 110 may receive a scan control signal from the display driver 200. The scan driver 110 may generate scan signals according to the scan control signal, and may supply the scan signals to the scan lines SL.

For example, the scan driver 110 may be formed in the non-display area NDA on one side (e.g., outer side) of the display area DA. It is, however, to be understood that the present disclosure is not limited thereto. For another example, the scan driver 110 may be formed in the non-display area NDA as a plurality, and may be located on both sides, or each outer side, of the display area DA.

The display driver 200 may be connected to display electrode pads DP of a display pad area DPA through display connection lines to receive digital video data and timing signals. The display driver 200 may convert the digital video data into analog positive/negative data voltages, and may supply them to the data lines DL through the data connection lines DLL. In addition, the display driver 200 may generate and supply a scan control signal for controlling the scan driver 110 through the scan control line SCL. The scan signals of the scan driver 110 may select pixels P to be supplied with data voltages, and the selected pixels P may receive the respective data voltages. The display driver 200 may be implemented as an integrated circuit (IC), and may be attached to the first substrate SUB1 by a chip-on-glass (COG) technique, a chip-on-plastic (COP) technique, or ultrasonic bonding.

Figure 5:
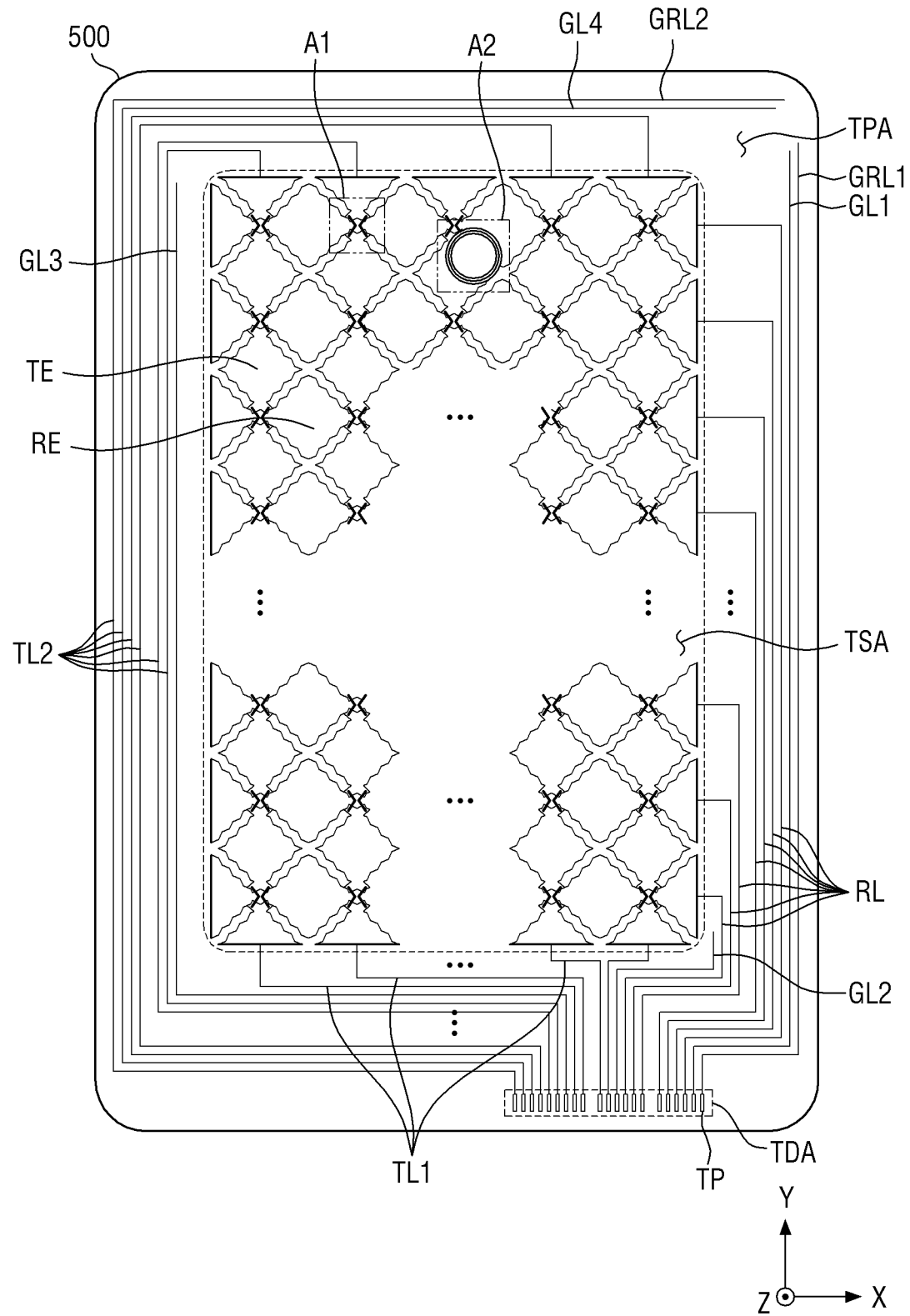
FIG. 5 is a plan view showing an example of the touch sensing unit shown in FIG. 3A.

FIG. 5 is a plan view showing an example of the touch sensing unit shown in FIG. 3A.

Referring to FIG. 5, the touch sensing unit 500 may include a touch sensor area TSA for sensing a user's touch, and a touch peripheral area TPA located around the touch sensor area TSA. The touch sensor area TSA may overlap with the display area DA of the display unit 100, and the touch peripheral area TPA may overlap with the non-display area NDA of the display unit 100.

The first touch electrodes TE and the second touch electrodes RE may be located in the touch sensor area TSA. The first touch electrodes TE and the second touch electrodes RE may be arranged such that they are spaced apart from one another (e.g., by a spacing or distance). For example, the first touch electrodes TE may be arranged in the first direction (x-axis direction), and may extend in the second direction (y-axis direction). The second touch electrodes RE may be located between the first touch electrodes TE, and may extend in the first direction (x-axis direction) while being spaced apart from one another in the second direction (y-axis direction). The first touch electrodes TE adjacent to one another in the second direction (y-axis direction) may be electrically connected with one another by touch island electrodes.

The first touch electrodes TE and the second touch electrodes RE may be formed to have a diamond shape or a triangular shape when viewed from the top. For example, the first touch electrodes TE and the second touch electrodes RE located on the edges of the touch sensor area TSA may be formed in a triangular shape when viewed from the top, and the other first touch electrodes TE and second touch electrodes RE may be formed in a diamond shape when viewed from the top. In addition, to prevent moiré patterns by the first touch electrodes TE and the second touch electrodes RE when a user watches images on the display device 10, the first touch electrode TE and the second touch electrodes RE may have curved sides when viewed from the top. For another example, the shape of the first touch electrodes TE and the second touch electrodes RE located in the touch sensor area TSA when viewed from the top is not limited to that shown in FIG. 5.

The first touch electrodes TE adjacent to one another in the second direction (y-axis direction) may be electrically connected to the touch island electrodes through connection electrodes. For example, a first touch electrode TE may be connected to a touch island electrode through a connection electrode, and the touch island electrode may be connected to another first touch electrode TE through another connection electrode. The connection electrodes are located on a different layer from the first touch electrodes TE and the second touch electrodes RE, and thus it is possible to reduce or prevent the likelihood of a short-circuit formed between the first touch electrodes TE and the second touch electrodes RE at their intersections. As a result, the first touch electrodes TE electrically connected in the second direction (y-axis direction) may be insulated from the second touch electrodes RE electrically connected in the first direction (x-axis direction).

First to third touch signal lines TL1, TL2, and RL and the touch electrode pads TP may be located in the touch peripheral area TPA.

One end of each of the first touch signal lines TL1 may be connected to the respective one of the first touch electrodes TE at a first side of the touch sensor area TSA. The first side of the touch sensor area TSA may refer to one of the four sides of the touch sensor area TSA that is closest to the touch pad area TDA where the touch electrode pads TP are located. The other end of each of the first touch signal lines TL1 may be connected to some of the touch electrode pads TP of the touch pad area TDA. Accordingly, the first touch signal lines TL1 may respectively connect the first touch electrodes TE located on the first side of the touch sensor area TSA with some touch electrode pads TP of the touch pad area TDA.

One end of each of the second touch signal lines TL2 may be connected to the respective one of the first touch electrodes TE located on a second side of the touch sensor area TSA. The second side of the touch sensor area TSA may refer to the side that is opposite to the first side of the touch sensor area TSA, and that is farthest from the touch pad area TDA. The other end of each of the second touch signal lines TL2 may be connected to others of the touch electrode pads TP of the touch pad area TDA. For example, the second touch signal lines TL2 may be connected to the first touch electrodes TE located on the second side of the touch sensor area TSA, while passing around the first side and a fourth side (e.g., left side, as shown in FIG. 5) of the touch sensor area TSA. Accordingly, the second touch signal lines TL2 may respectively connect the first touch electrodes TE located on the second side of the touch sensor area TSA with some other touch electrode pads TP of the touch pad area TDA.

One end of each of the third touch signal lines RL may be connected to the respective one of the second touch electrodes RE located on a third side (e.g., right side, as shown in FIG. 5) of the touch sensor area TSA. The third side of the touch sensor area TSA may refer to the side that is opposite to the fourth side of the touch sensor area TSA. The other end of each of the third touch signal lines RL may be connected to others of the touch electrode pads TP of the touch pad area TDA. Accordingly, the third touch signal lines RL may respectively connect the second touch electrodes RE located on the third side of the touch sensor area TSA with others of the touch electrode pads TP of the touch pad area TDA.

The touch electrode pads TP may be located on one side of the second substrate SUB2. The touch circuit board 410 may be attached on the touch electrode pads TP using an anisotropic conductive film. Accordingly, the touch electrode pads TP may be electrically connected to the touch circuit board 410.

The first touch electrodes TE and the second touch electrodes RE may be driven by mutual capacitive sensing or self-capacitive sensing.

For example, when the first touch electrodes TE and the second touch electrodes RE are driven by mutual capacitive sensing, the touch driving signals may be respectively supplied to the first touch electrodes TE by the first touch signal lines TL1 and the second touch signal lines TL2 to thereby charge mutual capacitances formed at the intersections of the first touch electrodes TE and the second touch electrodes RE. The touch driver 400 may measure a change in the charge amount of the mutual capacitances formed between the first and second touch electrodes TE and RE through the third touch signal lines RL, and may determine whether there is a touch input based on the change in the charge amount of the mutual capacitances. The touch driving signals may have touch driving pulses.

For another example, when the first touch electrodes TE and the second touch electrodes RE are driven by self-capacitive sensing, the first to third touch signal lines TL1, TL2 and RL my supply the touch driving signals to the first touch electrodes TE as well as to the second touch electrodes RE to thereby charge the self-capacitance of the first touch electrodes TE and the second touch electrodes RE. The touch driver 400 may measure a change in the charge amount of the self-capacitances through the first to third touch signal lines TL1, TL2 and RL, and may determine whether there is a touch input based on the change in the charge amount of the self-capacitances.

In the following description, the touch driver 400 is driven by the mutual capacitive sensing, in which touch driving pulses are applied to the first touch electrodes TE, and a change in the charge amount of the mutual capacitances is measured through the third touch signal lines RL connected to the second touch electrodes RE. In the mutual capacitive sensing, the first touch electrodes TE may serve as touch driving electrodes, the second touch electrodes RE may serve as touch sensing electrodes, the first and second touch signal lines TL1 and TL2 may serve as touch driving lines, and the third touch signal lines RL may serve as touch sensing lines.

For example, first to fourth guard lines GL1, GL2, GL3 and GL4, and first and second ground lines GRL1 and GRL2 may be located at the touch peripheral area TPA.

The first guard line GL1 may be arranged on the outer side of the outermost one of the third touch signal lines RL. The first ground line GRL1 may be located on the outer side of the first guard line GL1. Accordingly, the first guard line GL1 is located between the outermost one of the third touch sing lines RL and the first ground line GRL1, so that it is possible to reduce influence caused by a change in the voltage of the first ground line GRL1 on the third touch signal lines RL. One end of the first guard line GL1 and one end of the first ground line GRL1 may be connected to ones of the touch electrode pads TP that are located at the rightmost position, although the present disclosure isn't limited thereto.

The second guard line GL2 may be located between the innermost one of the third touch signal lines RL and the rightmost one of the first touch signal lines TL1. Accordingly, the second guard line GL2 may reduce mutual influence between the third touch signal lines RL and the first touch signal lines TL1. One end of the second guard line GL2 may be connected to the touch electrode pads TP.

The third guard line GL3 may be located between the leftmost one of the first touch signal lines TL1 and the innermost one of the second touch signal lines TL2. Accordingly, the third guard line GL3 may reduce mutual influence between the first touch signal lines TL1 and the second touch signal lines TL2. One end of the third guard line GL3 may be connected to the touch electrode pads TP.

The fourth guard line GL4 may be arranged on the outer side of the outermost one of the second touch signal lines TL2. The second ground line GRL2 may be located on the outer side of the fourth guard line GL4. Accordingly, the fourth guard line GL4 is located between the outermost one of the second touch signal lines TL2 and the second ground line GRL2, so that it is possible to reduce the influence by a change in the voltage of the second ground line GRL2 on the second touch signal lines TL2. One end of the fourth guard line GL4 and one end of the second ground line GRL2 may be connected to the touch electrode pads TP that are the leftmost ones.

The first ground line GRL1 may be located at the outermost position on the right side of the touch sensing unit 500, and the second ground line GRL2 may be located at the outermost positions on the lower, left and upper sides of the touch sensing unit 500. The first ground line GRL1 and the second ground line GRL2 may receive a ground voltage. Therefore, when static electricity is applied from the outside, the static electricity may be discharged to the first ground line GRL1 and the second ground line GRL2.

For example, when the first touch electrodes TE and the second touch electrodes RE are driven by the mutual capacitance, the first to fourth guard lines GL1, GL2, GL3 and GL4 may receive the ground voltage.

Figure 6:
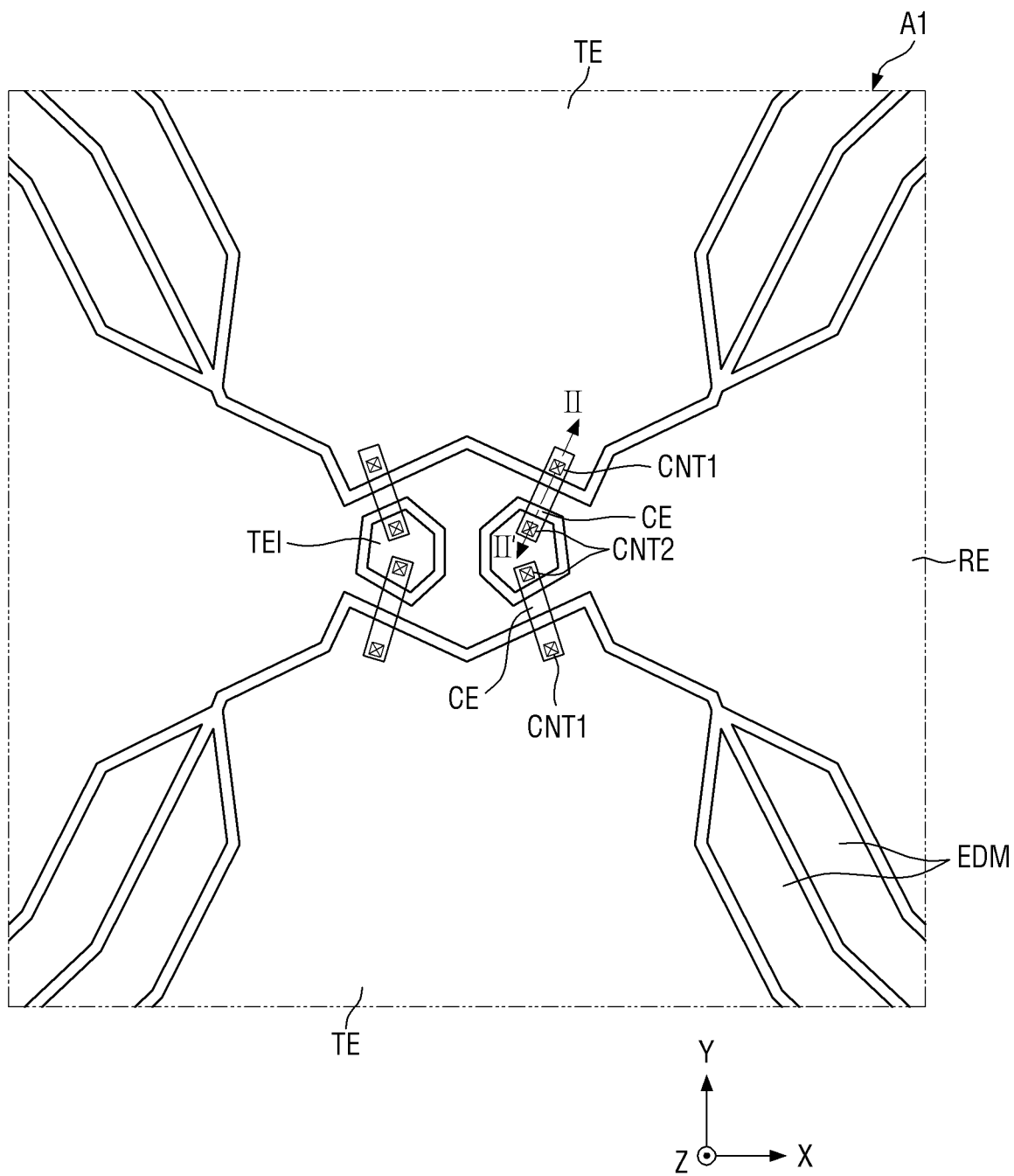
FIG. 6 is an enlarged view of the area A1 of FIG. 5.
Figure 7:
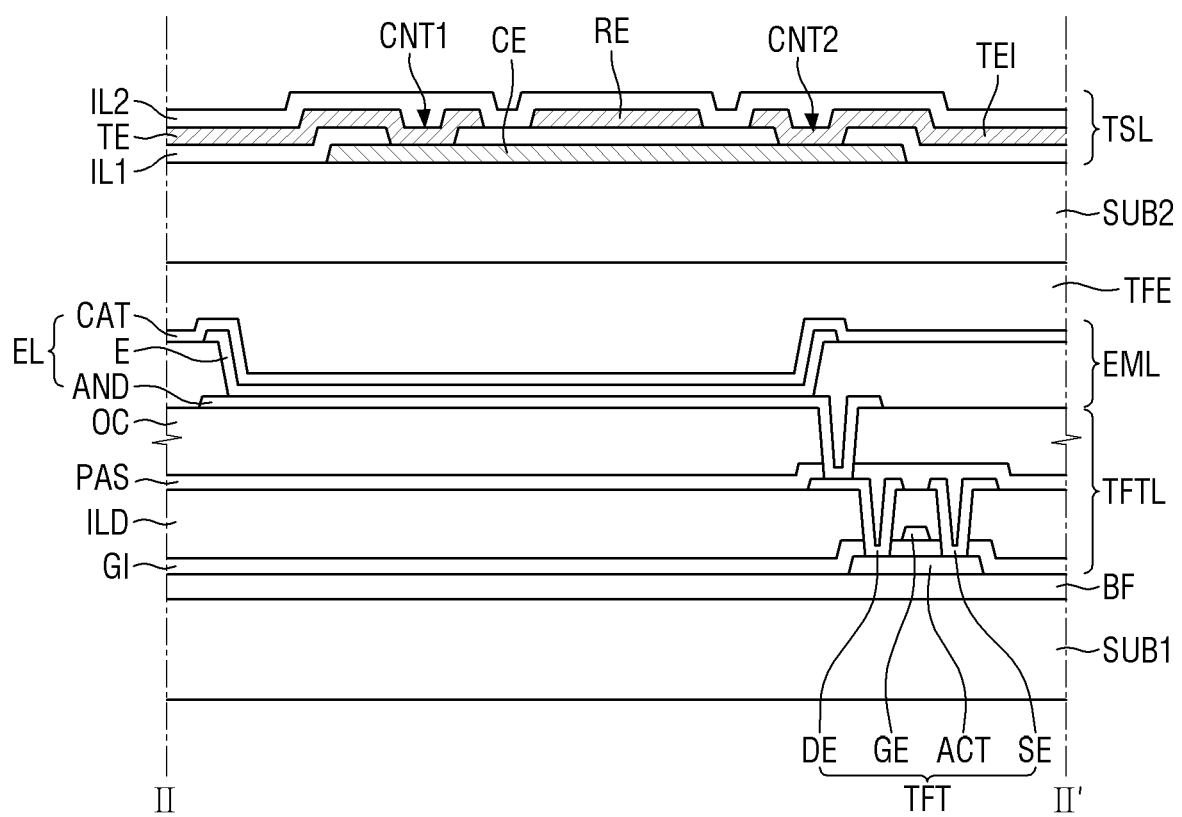
FIG. 7 is a cross-sectional view taken along the line II-II' of FIG. 6.

FIG. 6 is an enlarged view of the area A1 of FIG. 5, and FIG. 7 is a cross-sectional view taken along the line II-II' of FIG. 6.

Referring to FIGS. 6 and 7, the first substrate SUB1 may be a base substrate or a base member, and may be made of an insulating material such as a polymer resin.

A buffer layer BF may be located on the first substrate SUB1. The buffer layer BF may be formed of an inorganic film that may reduce or prevent the permeation of air or moisture. For example, the buffer layer BF may include a plurality of inorganic films alternatingly stacked on one another. The buffer layer BF may be made up of, but is not limited to, multiple layers in which one or more inorganic layers of a silicon nitride layer, a silicon oxynitride layer, a silicon oxide layer, a titanium oxide layer and an aluminum oxide layer are alternately stacked on one another.

The thin-film transistor layer TFTL may include a thin-film transistor TFT, a gate insulating layer GI, an interlayer dielectric layer ILD, a passivation layer PAS, and a planarization layer OC.

The thin-film transistor TFT may be located on the buffer layer BF, and may form a pixel circuit, or a portion thereof, of each of a plurality of pixels. For example, the thin-film transistor TFT may be a driving transistor or a switching transistor of the pixel circuit. The thin-film transistor TFT may include a semiconductor layer ACT, a gate electrode GE, a source electrode SE, and a drain electrode DE.

The semiconductor layer ACT may be located on the buffer layer BF. The semiconductor layer ACT may overlap the gate electrode GE, the source electrode SE and the drain electrode DE. The semiconductor layer ACT may be in direct contact with the source electrode SE and the drain electrode DE, and may face the gate electrode GE with the gate insulating layer GI therebetween.

The gate electrode GE may be located on the gate insulating layer GI. The gate electrode GE may overlap the semiconductor layer ACT with the gate insulating layer GI interposed therebetween.

The source electrode SE and the drain electrode DE are located on the interlayer dielectric layer ILD such that they are spaced apart from each other. The source electrode SE may be in contact with one end of the semiconductor layer ACT through a contact hole formed in the gate insulating layer GI and the interlayer dielectric layer ILD. The drain electrode DE may be in contact with the other end of the semiconductor layer ACT through another contact hole formed in the gate insulating layer GI and the interlayer dielectric layer ILD. The drain electrode DE may be connected to a first electrode AND of the light-emitting element EL through a contact hole formed in the passivation layer PAS and the planarization layer OC.

The gate insulating layer GI may be located on the semiconductor layer ACT. For example, the gate insulating layer GI may be located on the semiconductor layer ACT and the buffer layer BF, and may insulate the semiconductor layer ACT from the gate electrode GE. The gate insulating layer GI may include contact holes through which the source electrode SE and the drain electrode DE respectively penetrate.

The interlayer dielectric layer ILD may be located over the gate electrode GE. For example, the interlayer dielectric layer ILD may include the contact hole via which the source electrode SE penetrates, and the contact hole via which the drain electrode DE penetrates. The contact holes of the interlayer dielectric layer ILD may be respectively connected to the contact holes of the gate insulating layer GI.

The passivation layer PAS may be located over the thin-film transistor TFT to protect the thin-film transistor TFT. For example, the passivation layer PAS may include a contact hole through which the first electrode AND passes.

For another example, the passivation layer PAS may be omitted from the display device 10. In such case, the planarization layer OC may be located on the thin-film transistor TFT to provide a flat surface over the thin-film transistor TFT.

The planarization layer OC may be located on the passivation layer PAS to provide a flat surface over the thin-film transistor TFT. For example, the planarization layer OC may include a contact hole through which the first electrode AND of the light-emitting element EL passes. The contact hole of the planarization layer OC may be connected to the contact hole of the passivation layer PAS.

The light-emitting element EL may be located on the thin-film transistor TFT. The light-emitting element EL may include a first electrode AND, an emissive layer E, and a second electrode CAT.

The first electrode AND may be located on the planarization layer OC. For example, the first electrode AND may be located to overlap the emission area or the open area defined by the pixel-defining layer. The first electrode AND may be connected to the drain electrode DE of the thin-film transistor TFT.

The emissive layer E may be located on the first electrode AND. The emissive layer E may include a hole injecting layer, a hole transporting layer, a light-receiving layer, an electron blocking layer, an electron transporting layer, an electron injecting layer, etc. For example, the emissive layer E may be, but is not limited to, an organic emission layer made of an organic material. If the emissive layer E is an organic emissive layer, when the thin-film transistor applies a voltage (e.g., a predetermined voltage) to the first electrode AND of the light-emitting element EL, and when the second electrode CAT of the light-emitting element EL receives a common voltage or cathode voltage, the holes and electrons may move to the organic emissive layer E through the hole transporting layer and the electron transporting layer, respectively, and they combine in the organic layer E to emit light.

The second electrode CAT may be located on the emissive layer E. For example, the second electrode CAT may be implemented as an electrode common to all pixels, as opposed to being located as a separated electrode for each of the pixels. The second electrode CAT may be located on the emissive layer E in the emission area, and may be located on the pixel-defining layer in regions other than the emission area.

The pixel-defining layer may define the emission area or the open areas. The pixel-defining layer may separate and insulate the first electrode AND of one of the plurality of light-emitting elements EL from the first electrode AND of another one of the light-emitting elements EL.

The second substrate SUB2 may be located on the display unit 100. The second substrate SUB2 may be a base substrate and may be made of an insulating material, such as a polymer resin. The second substrate SUB2 may reduce or prevent oxygen or moisture permeating into the light-emitting elements EL.

The touch sensor layer TSL may be located on the second substrate SUB2. The touch sensor layer TSL may include first and second touch electrodes TE and RE, touch island electrodes TEI, connection electrodes CE, and first and second insulating layers IL1 and IL2.

The connection electrodes CE may be located on the second substrate SUB2. Each of the connection electrodes CE may connect a respective first touch electrode TE with a respective touch island electrode TEI. For example, an end of each of the connection electrodes CE may be connected to a respective first touch electrode TE and the other end thereof may be connected to a respective touch island electrode TEI.

The connection electrodes CE may be formed as an opaque metal conductive layer. For example, the connection electrodes CE may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof. For example, the connection electrodes CE do not overlap with the emission area of the pixel P, so that the aperture ratio of the pixel P is not reduced. It is, however, to be understood that the present disclosure is not limited thereto. The touch island electrode TEI may be located between first touch electrodes TE that are adjacent to each other in the second direction (y-axis direction) to reduce the length of the connection electrodes CE.

The first insulating layer IL1 may cover the connection electrode CE and the second substrate SUB2. For example, the first insulating layer IL1 may be formed of an inorganic layer, for example, a silicon nitride layer, a silicon oxynitride layer, a silicon oxide layer, a titanium oxide layer, or an aluminum oxide layer.

The first touch electrodes TE, the touch island electrodes TEI, and the second touch electrodes RE may be located on the first insulating layer IL1. The first touch electrode TE may be connected to the connection electrode CE through a first contact hole CNT1 penetrating through the first insulating layer IL1, and the connection electrode CE may be connected to the touch island electrode TEI through a second contact hole CNT2 penetrating through the first insulating layer IL1. Accordingly, the connection electrode CE may electrically connect the first touch electrode TE with the touch island electrode TEI. Accordingly, the first touch electrodes TE spaced apart from one another in the second direction (y-axis direction) with the second touch electrodes RE therebetween may be electrically connected through the connection electrode CE and the touch island electrode TEI.

For example, the first touch electrodes TE, the first touch island electrodes TEI, and the second touch electrodes RE may be made of a transparent metal oxide (TCO) that may transmit light, such as ITO and IZO. Accordingly, even if the first touch electrodes TE, the touch island electrodes TEI and the second touch electrodes RE overlap the pixels P, the aperture ratio of the pixel P is not reduced.

The second insulating layer IL2 may cover the first touch electrodes TE, the touch island electrodes TEI, and the second touch electrodes RE. For example, the second insulating layer IL2 may be formed of an inorganic layer, for example, a silicon nitride layer, a silicon oxynitride layer, a silicon oxide layer, a titanium oxide layer, or an aluminum oxide layer.

Figure 8:
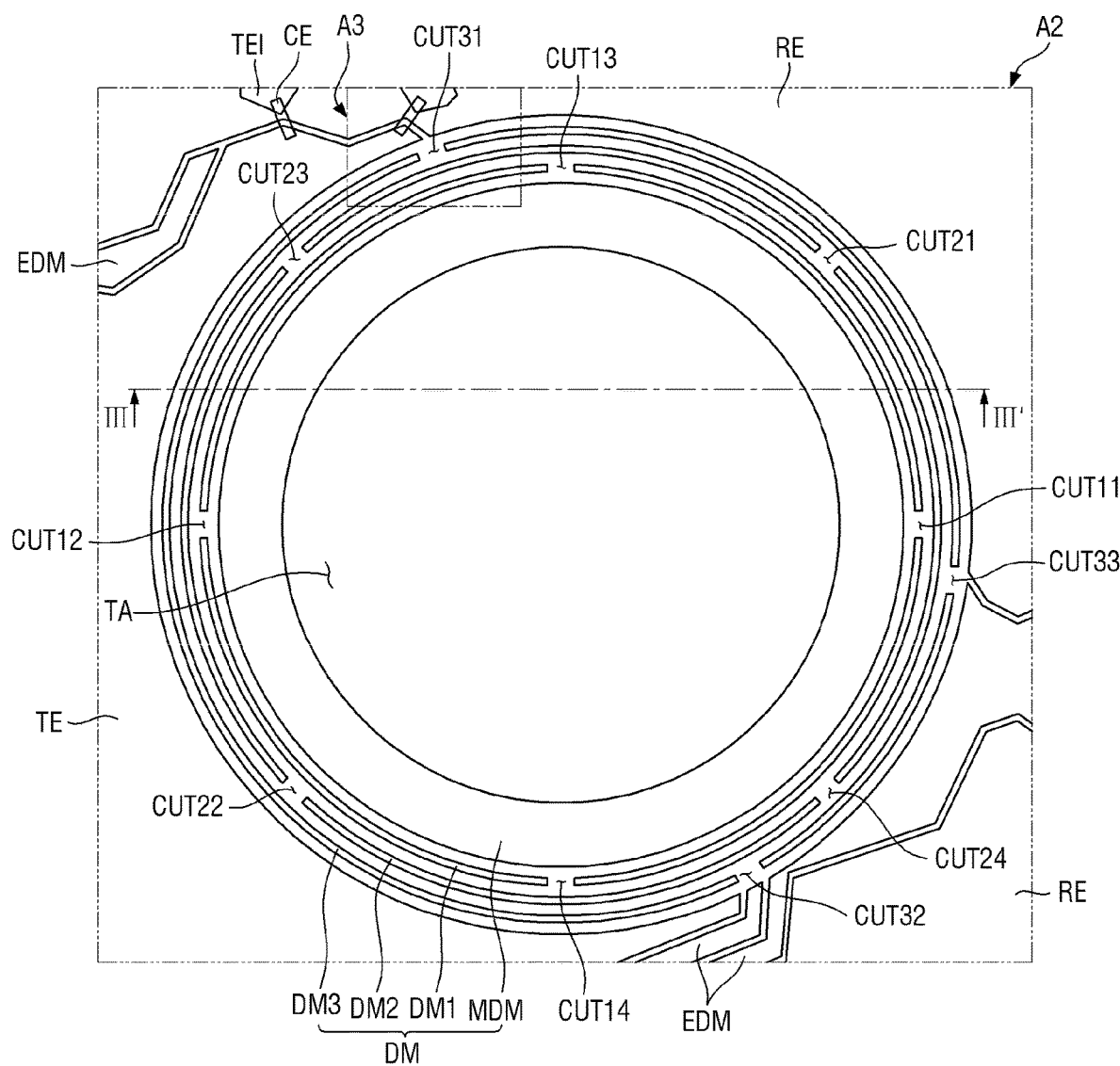
FIG. 8 is an enlarged plan view showing an example of the area A2 of FIG. 5.
Figure 9:
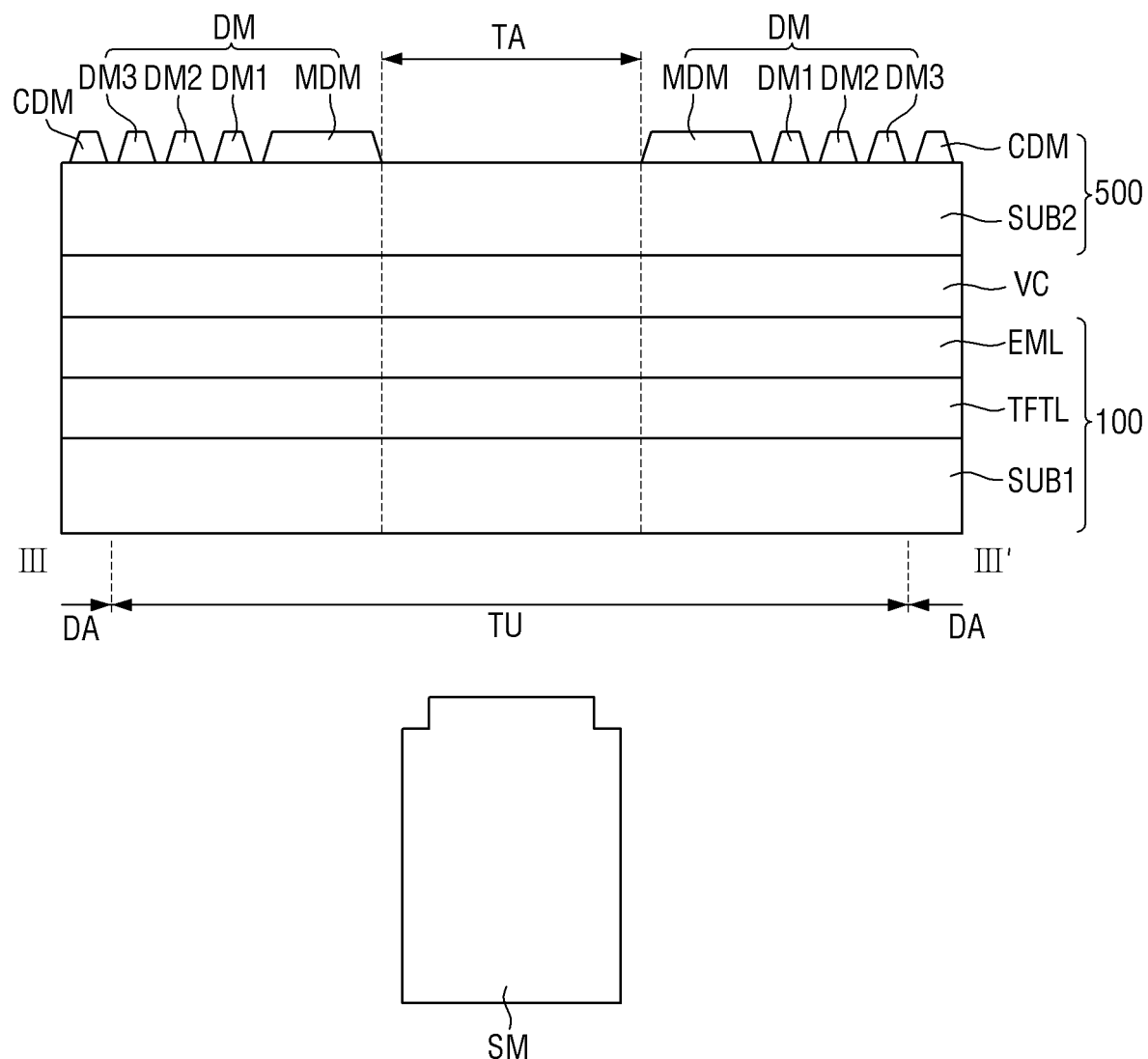
FIG. 9 is an example of a cross-sectional view, taken along the line III-III' of FIG. 8.
Figure 10:
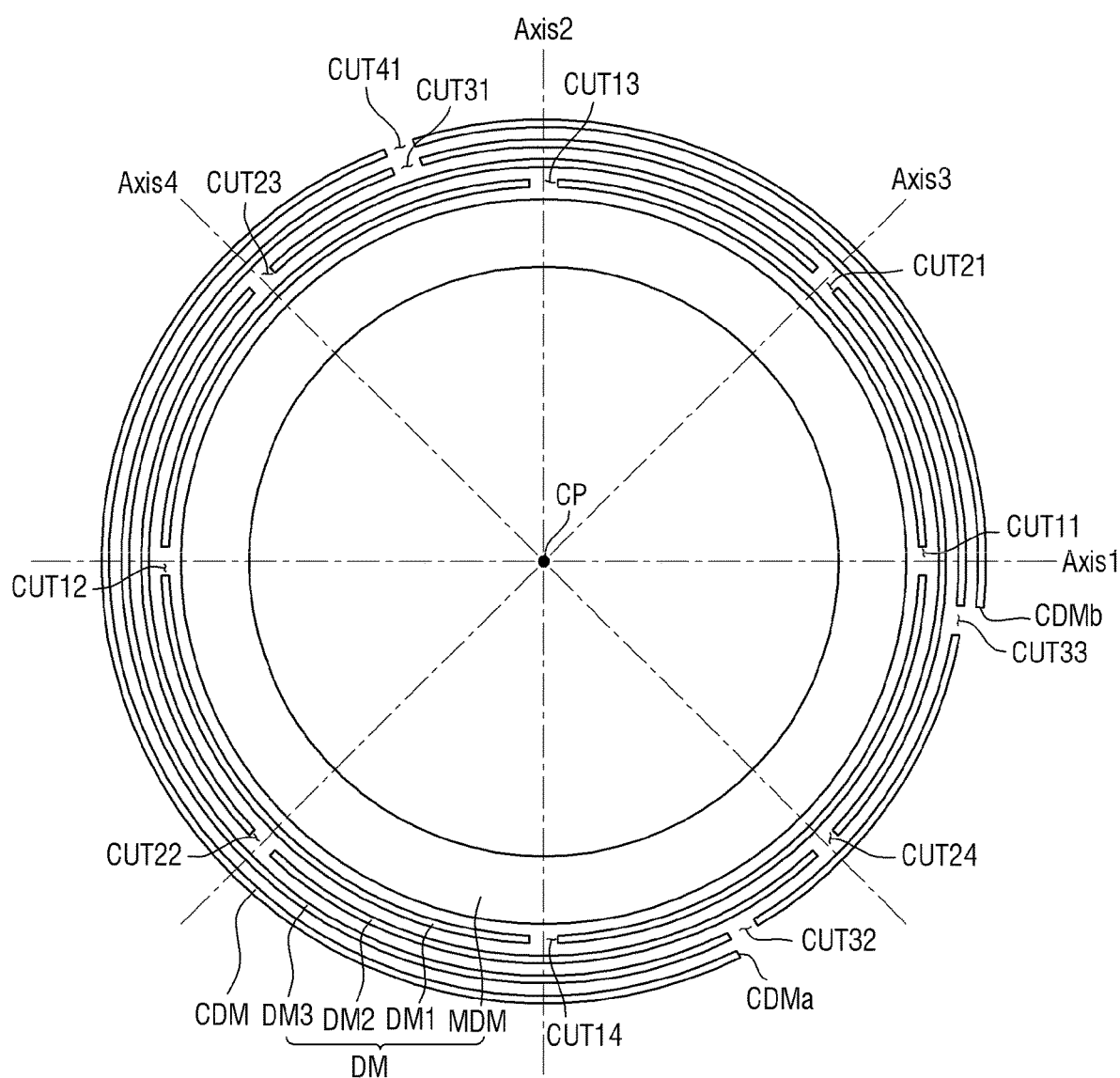
FIG. 10 is a view showing the dummies and the contact dummy shown in FIG. 8.
Figure 11:
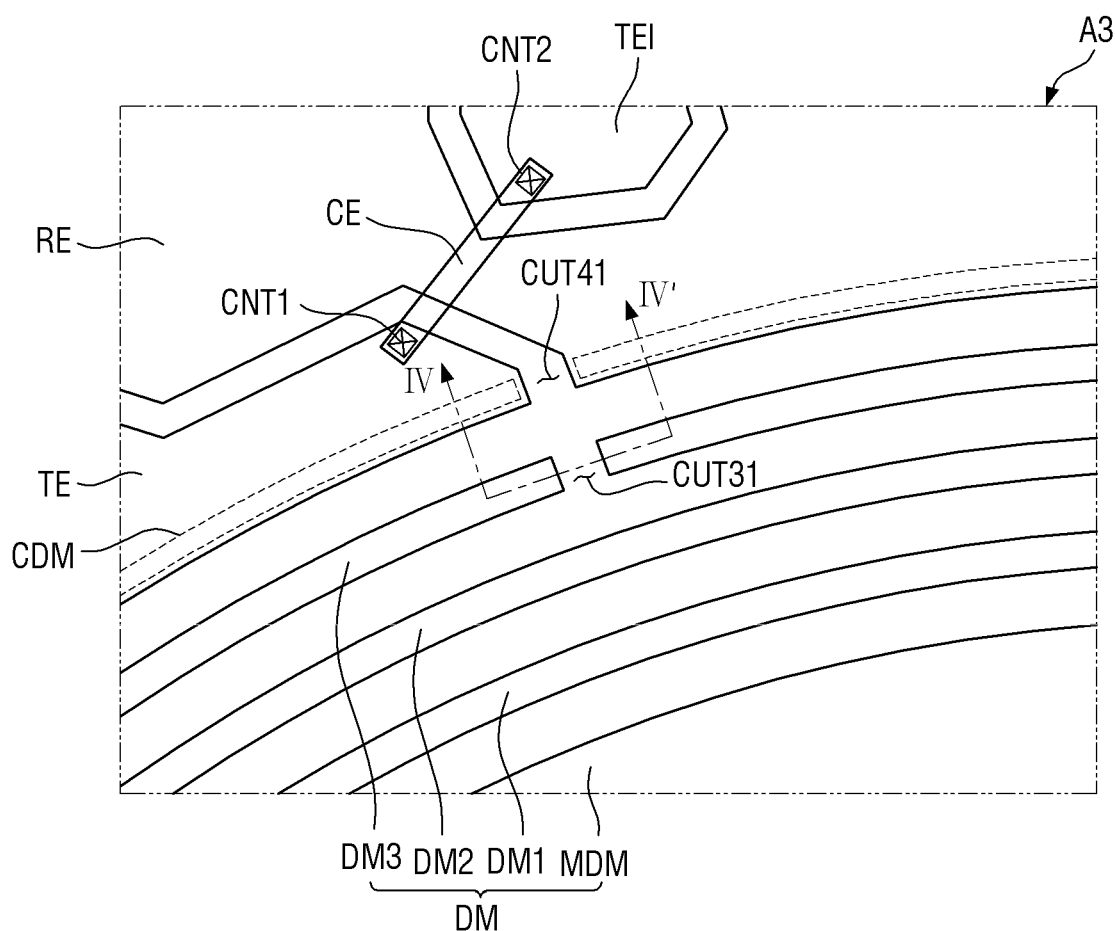
FIG. 11 is an enlarged view of the area A3 of FIG. 8.
Figure 12:
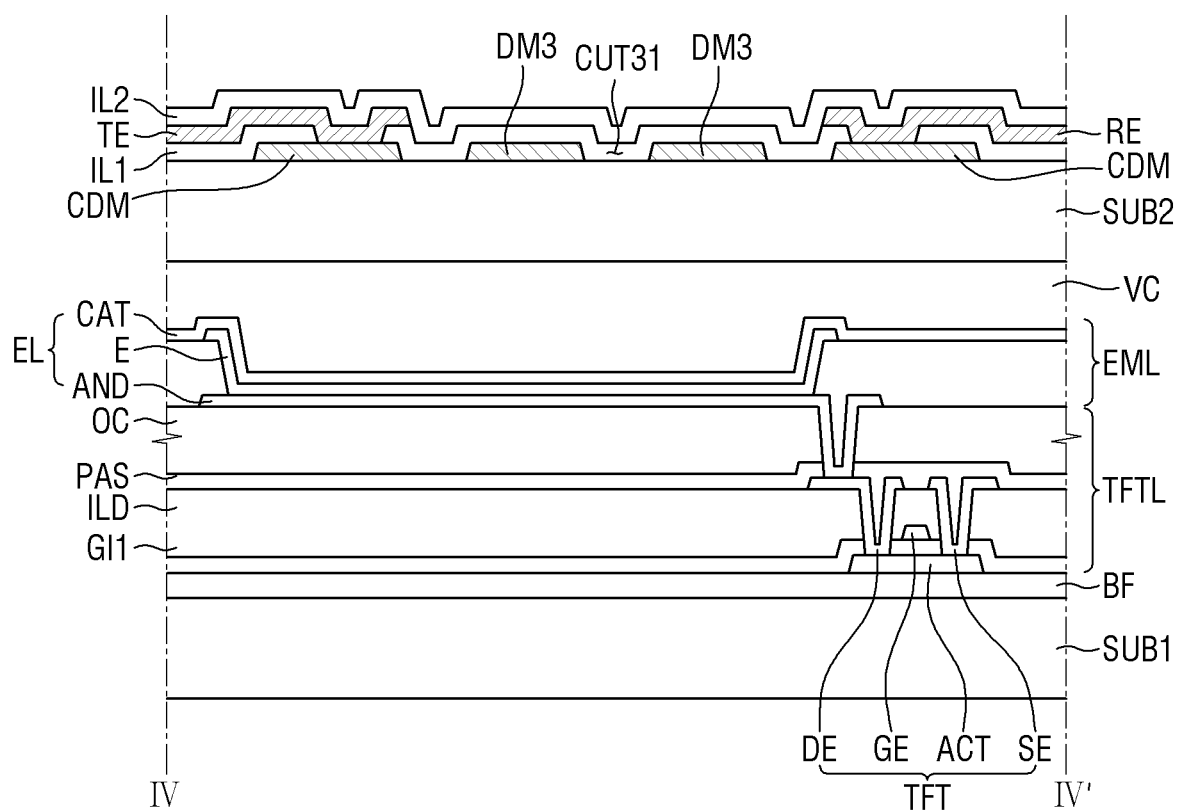
FIG. 12 is a cross-sectional view taken along the line IV-IV' of FIG. 11.

FIG. 8 is an enlarged plan view showing an example of the area A2 of FIG. 5, FIG. 9 is an example of a cross-sectional view, taken along the line III-III' of FIG. 8, FIG. 10 is a view showing the dummies and the contact dummy shown in FIG. 8, FIG. 11 is an enlarged plan view of the area A3 of FIG. 8, and FIG. 12 is a cross-sectional view taken along the line IV-IV' of FIG. 11.

Referring to FIGS. 8 to 12, a display unit 100 may include a display area DA and a transmitting portion TU (see FIG. 9).

The display area DA may include a plurality of pixels P. Each of the pixels P may be connected to at least one scan line SL, data line DL, and power line PL. Each of the pixels P may include thin-film transistors including a driving transistor and at least one switching transistor, a light-emitting element, and a capacitor. When a scan signal is applied from a scan line SL, corresponding ones of the pixels P receive a data voltage of a corresponding data line DL, and supply a driving current to the light-emitting element according to the data voltage applied to the gate electrode, such that light is emitted.

The transmitting portion TU of the display unit 100 may be surrounded by the display area DA when viewed from the top. The transmitting portion TU may include a transparent material, and may allow the transmission of light entering and exiting a sensor module SM.

The touch sensor layer TSL of the touch sensing unit 500 may include first touch electrodes TE, second touch electrodes RE, an electrode dummy EDM, a transmissive area TA, dummies DM, and a contact dummy CDM.

The electrode dummy EDM may be located between a respective first touch electrode TE and a respective second touch electrode RE to prevent a short circuit between the first touch electrode TE and the second touch electrode RE, and to reduce the basic capacitance of the touch sensor layer TSL. For example, if the first touch electrodes TE and the second touch electrodes RE are spaced apart from one another (e.g., by a minimum distance) and face each other, the basic capacitance may increase, and the touch sensitivity may deteriorate. The electrode dummy EDM may be located on a different layer from the first touch electrodes TE and the second touch electrodes RE, but might not overlap the first touch electrodes TE and the second touch electrodes RE in a z-axis direction (e.g., a fifth direction that is substantially perpendicular to each of the first and second directions). Accordingly, the electrode dummy EDM may control a separation distance between the first touch electrodes TE and the second touch electrodes RE, and it is possible to precisely detect a change in the charge amount of the mutual capacitances by adjusting the basic capacitance of the touch sensor layer TSL. The electrode dummy EDM may be located between the first touch electrodes TE and the second touch electrodes RE to improve the touch sensitivity of the touch sensing unit 500.

For example, when the first touch electrodes TE and the second touch electrodes RE have a diamond shape when viewed from the top, the electrode dummy EDM may be located between the first touch electrodes TE and the second touch electrodes RE. In such case, the electrode dummy EDM may extend in a third direction (e.g., a diagonal direction in a plan view), which is between the first direction (x-axis direction) and the second direction (y-axis direction), may extend in a direction that is opposite to the third direction, may extend in a fourth direction (e.g., a different diagonal direction (than the third direction) in a plan view), which is between a direction that is opposite to the first direction (x-axis direction) and the second direction (y-axis direction), or may extend in a direction that is opposite to the fourth direction, between respective adjacent ones of the first touch electrodes TE and the second touch electrodes RE. The electrode dummy EDM may be located to not be between first touch electrodes TE that are adjacent in the second direction (y-axis direction). Alternatively, the electrode dummy EDM may be located away from a region of the first touch electrodes TE that is adjacent to the touch island electrode TEI. Accordingly, the first touch electrodes TE that are adjacent in the first direction (x-axis direction) may be spaced apart from each other by a distance that is equal to the area of the electrode dummy EDM, and may be insulated from each other. Similarly, the second touch electrodes RE that are adjacent in the second direction (y-axis direction) may be spaced apart from each other by a distance that is equal to the area of the electrode dummy EDM, and may be insulated from each other.

For example, the electrode dummy EDM may be floating and may receive no voltage. It is, however, to be understood that the present disclosure is not limited thereto. For another example, the electrode dummy EDM may receive a voltage that would not substantially affect the capacitance of the touch sensor layer TSL. As the touch sensing unit 500 includes the electrode dummy EDM, it is possible to sensitively measure a change in the charge amount of the mutual capacitances between the first and second touch electrodes TE and RE.

The electrode dummy EDM may be located on the second substrate SUB2, and may be covered by the first insulating layer IL1. The electrode dummy EDM may be located on a different layer from the first touch electrodes TE and the second touch electrodes RE, but might not overlap the first touch electrodes TE and the second touch electrodes RE in the z-axis direction. The electrode dummy EDM may be formed as, but is not limited to, an opaque metal conductive layer.

The transmissive area TA of the touch sensing unit 500 may be surrounded by at least one of the first touch electrodes TE and at least one of second touch electrodes RE in the touch sensor area TSA. For example, the transmissive area TA may overlap the transmitting portion TU of the display unit 100.

For example, the transmissive area TA may have, but is not limited to, a circular shape when viewed from the top. As another example, the transmissive area TA may have a shape of a polygonal column or an amorphous column. In such case, the transmissive area TA may have a polygonal shape including a quadrangle or an amorphous shape when viewed from the top.

The display unit 100 may include a camera module or the sensor module SM located in line with, or aligned with, the transmissive area TA. The camera module or the sensor module SM may be located below the display unit 100 (e.g., at the back side of the display unit 100). For example, the sensor module SM may include at least one of an illuminance sensor, a proximity sensor, an infrared sensor, and an ultrasonic sensor. Accordingly, the display device 10 includes the transmitting portion TU surrounded by the display area DA, the transmissive area TA overlapping the transmitting portion TU, and the camera module or sensor module SM overlapping the transmissive area TA, and thus dead space may be reduced when compared to other display devices where a camera module or a sensor module is located on one side of the non-display area. In addition, the thickness of the display device 10 may be reduced as the camera module or the sensor module SM overlaps the transmissive area TA.

The dummies DM may overlap the transmitting portion TU of the display unit 100 to surround the transmissive area TA, and may be insulated from the first and second touch electrodes TE and RE. The portions of the transmitting portion TU of the display unit 100 that overlap the dummies DM may fall in the non-display area. The dummies DM may remove external noise through the transmissive area TA, and may reduce or prevent coupling between the first touch electrodes TE and the second touch electrodes RE. For example, signals transmitted or received by the camera module or the sensor module SM may be transmitted through the transmissive area TA, and such signals may affect the capacitance between first touch electrodes TE or second touch electrodes RE. The signals transmitted through the transmissive area TA may cause noise in the touch sensor layer TSL. To avoid such noise, the dummies DM surround the transmissive area TA to thereby separate the first touch electrodes TE and the second touch electrodes RE from the transmissive area TA.

The dummies DM may control the capacitance of the touch sensor layer TSL like the electrode dummy EDM, and may reduce or prevent the coupling between the first touch electrodes TE and the second touch electrodes RE. For example, the dummies DM may be located on a different layer from the first touch electrodes TE and the second touch electrodes RE, but might not overlap the first touch electrodes TE and the second touch electrodes RE in the z-axis direction. Accordingly, the dummies DM may adjust the basic capacitance of the touch sensor layer TSL, and may improve the touch sensitivity of the touch sensing unit 500.

For example, the dummies DM may be floating and may receive no voltage. It is, however, to be understood that the present disclosure is not limited thereto. For another example, the dummies DM may receive a voltage that would not substantially affect the capacitance of the touch sensor layer TSL. As the touch sensing unit 500 includes the dummies DM, it is possible to sensitively measure a change in the charge amount of the mutual capacitances between the first and second touch electrodes TE and RE.

The dummies DM may include a main dummy MDM directly surrounding the transmissive area TA and at least one sub-dummy surrounding the main dummy MDM. For example, the dummies DM may include the main dummy MDM and the first to third subsidiary dummies/sub-dummies DM1, DM2, and DM3. It is to be noted that the number of the subsidiary dummies is not limited to three.

The main dummy MDM directly surrounds the transmissive area TA, thereby blocking external noise through the transmissive area TA. For example, the main dummy MDM may have a circular shape having a thickness (e.g., a predetermined thickness) in a plan view. The thickness of the main dummy MDM may be greater than the sum of the thicknesses of the first to third subsidiary dummies DM1, DM2, and DM3 when viewed from the top. Therefore, the main dummy MDM has thickness (e.g., a predetermined thickness) so that external noise through the transmissive area TA may be efficiently reduced or removed.

The first sub-dummy DM1 may surround the main dummy MDM, the second sub-dummy DM2 may surround the first sub-dummy DM1, and the third sub-dummy DM3 may surround the second sub-dummy DM2. The third sub-dummy DM3 may be an outermost sub-dummy that is located at the outermost position of the dummies (e.g., at the outermost position of the sub-dummies DM). At least one of the first touch electrodes TE and at least one of the second touch electrodes RE may be partially removed depending on the positions of the transmissive area TA and the dummies DM, and may face each other directly. In addition, the third sub-dummy DM3 may directly face the partially removed first touch electrode and second touch electrode when viewed from the top/in a plan view.

The first sub-dummy DM1 may include a (1-1) cut CUT11 and a (1-2) cut CUT12 overlapping a first axis Axis1 extending in the first direction (x-axis direction) passing through the center CP of the transmissive area TA. The first sub-dummy DM1 may include a (1-3) cut CUT13 and a (1-4) cut CUT14 overlapping a second axis Axis2 extending in the second direction (y-axis direction) passing through the center CP of the transmissive area TA. As the first sub-dummy DM1 includes the (1-1) cut CUT11, the (1-2) cut CUT12, the (1-3) cut CUT13, and the (1-4) cut CUT14, it is possible to reduce or prevent coupling through the first sub-dummy DM1.

The second sub-dummy DM2 may include a (2-1) cut CUT21 and a (2-2) cut CUT22 overlapping a third axis Axis3 extending in the third direction, which is between the first direction (x-axis direction) and the second direction (y-axis direction), and passing through the center CP of the transmissive area TA. The second sub-dummy DM2 may include a (2-3) cut CUT23 and a (2-4) cut CUT24 overlapping a fourth axis Axis4 extending in the fourth direction, which is between the opposite direction to the first direction (x-axis direction) and the second direction (y-axis direction), and passing through the center CP of the transmissive area TA. As the second sub-dummy DM2 includes the (2-1) cut CUT21, the (2-2) cut CUT22, the (2-3) cut CUT23 and the (2-4) cut CUT24, it is possible to reduce or prevent the coupling through the second sub-dummy DM2.

The third sub-dummy DM3 may include a (3-1) cut CUT31 corresponding to a gap between directly adjacent first and second touch electrodes TE and RE among the first and second touch electrodes TE and RE. The (3-1) cut CUT31 may be formed by cutting the third sub-dummy DM3 so that its size is equal to the gap between the directly adjacent first and second touch electrodes TE and RE. Therefore, both ends of the third sub-dummy DM3 at the (3-1) cut CUT31 may be insulated from each other.

The third sub-dummy DM3 might not overlap the first touch electrodes TE and the second touch electrodes RE in the z-axis direction. For example, if an error occurs during the process of patterning the first touch electrodes TE, the second touch electrodes RE, and the dummies DM, then a directly adjacent first touch electrode TE and the third sub-dummy DM3 may partially overlap, or may be too close, and/or a directly adjacent second touch electrode RE and the third sub-dummy DM3 may partially overlap, or may be too close. When this happens, coupling may occur between the directly adjacent first touch electrode TE and the third sub-dummy DM3, or between the directly adjacent second touch electrode RE and the third sub-dummy DM3. If a part of the third sub-dummy DM3 that is coupled with the first touch electrode TE and another part of the third sub-dummy DM3 that is coupled with the second touch electrode RE, are not insulated from each other, undesirable coupling may occur between the first touch electrode TE and the second touch electrode RE, such that the sensitivity of the touch sensing unit 500 may be deteriorated or such that the touch sensing unit 500 may not even work. In this regard, as the third sub-dummy DM3 includes the (3-1) cut CUT31, a part of the third sub-dummy DM3 directly facing (e.g., most adjacent, or closest to) the first touch electrode TE may be insulated from another part of the third sub-dummy DM3 directly facing the second touch electrode RE. As the third sub-dummy DM3 includes the (3-1) cut CUT31, it is possible to reduce or eliminate the possibility of the coupling between the first touch electrode TE and the second touch electrode RE.

For example, the (3-1) cut CUT31 of the third sub-dummy DM3 may be located at a shortest distance from (e.g., may be located to be directly adjacent) the gap between the directly adjacent first and second touch electrodes TE and RE. The length of the (3-1) cut CUT31 may be larger than a corresponding dimension of the gap between the directly adjacent first and second touch electrodes TE and RE. It is, however, to be understood that the present disclosure is not limited thereto. An imaginary straight line connecting the gap between the first and second touch electrodes TE and RE with the (3-1) cut CUT31 of the third sub-dummy DM3 may pass through the center CP of the transmissive area TA. It is, however, to be understood that the present disclosure is not limited thereto. The design of the (3-1) cut CUT31 of the third sub-dummy DM3 may be altered in a variety of manners as long as a part of the third sub-dummy DM3 directly facing the first touch electrode TE may be insulated from another part of the third sub-dummy DM3 directly facing the second touch electrode RE.

The outermost sub-dummy DM3 located at the outermost position of the dummies DM may further include a (3-2) cut CUT32 and a (3-3) cut CUT33 respectively corresponding to gaps between an adjacent electrode dummy EDM and a respective one of the first and second touch electrodes TE and RE. In FIG. 8, the lower right side of the dummies DM, collectively, may directly face the electrode dummy EDM. The first touch electrode TE may be spaced apart from the second touch electrode RE by a distance that is equal to a distance between the dummies DM and the electrode dummy EDM at an area where the dummies DM and the electrode dummy EDM directly face each other. A part of the third sub-dummy DM3 may be partially surrounded by the first touch electrode TE and/or the second touch electrode RE, and another part of the third sub-dummy DM3 may be partially surrounded by the electrode dummy EDM. Alternatively, a part of the third sub-dummy DM3 may be surrounded by the contact dummy CDM, and another part of the third sub-dummy DM3 may be surrounded by the electrode dummy EDM. Therefore, the (3-2) cut CUT32 of the third sub-dummy DM3 may be located between the first touch electrode TE and the electrode dummy EDM, which directly face each other, and the (3-3) cut CUT33 may be located between the second touch electrode RE and the electrode dummy EDM, which directly face each other. As the third sub-dummy DM3 includes the (3-2) cut CUT32 and the (3-3) cut CUT33, a part of the third sub-dummy DM3 directly facing the first touch electrode TE may be insulated from another part of the third sub-dummy DM3 directly facing the second touch electrode RE. As the third sub-dummy DM3 includes the (3-2) cut CUT32 and the (3-3) cut CUT33, it is possible to reduce or entirely eliminate the possibility of the coupling between the first touch electrode TE and the second touch electrode RE. The dummies DM may be located on the second substrate SUB2 and may be covered by the first insulating layer IL1. The dummies DM may be located on a different layer from the first touch electrodes TE and the second touch electrodes RE, but might not overlap the first touch electrodes TE and the second touch electrodes RE in the z-axis direction. The dummies DM may be formed as, but are not limited to, an opaque metal conductive layer.

The contact dummy CDM may partially or substantially surround the sub-dummy DM3, which is an outermost sub-dummy that is located at the outermost position of the dummies DM, and may come in contact with the first touch electrode TE or the second touch electrode RE that directly face the sub-dummy DM3. At least one of the first touch electrodes TE and at least one of the second touch electrodes RE may be partially removed depending on the positions of the transmissive area TA and the dummies DM. The partially removed first touch electrode TE or second touch electrode RE may directly face the third sub-dummy DM3. The area of the partially removed first touch electrode TE or second touch electrode RE may be smaller than the area of the other first touch electrodes TE or second touch electrodes RE. The internal resistance of the partially removed first touch electrode TE or second touch electrode RE may be smaller than that of the other electrodes. In this regard, the first touch electrode TE or the second touch electrode RE directly facing the third sub-dummy DM3 may be electrically connected to the contact dummy CDM to thereby increase the internal resistance. The shape and size of the contact dummy CDM may be designed to compensate for the reduced internal resistance. Accordingly, the shape or size of the contact dummy CDM may be increased as the amount of the portions removed from the first touch electrode TE or the second touch electrode RE increases. The internal resistance of the partially removed first touch electrode TE or second touch electrode RE connected to the contact dummy CDM may be equal to the inner resistance of the other first touch electrode TE or second touch electrode, which is not partially removed.

For example, the width of the contact dummy CDM may be greater than the width of the sub-dummy DM3 located at the outermost position of the dummies DM. It is to be noted that the width of the contact dummy CDM in a plan view may be altered depending on the design of the transmissive area TA, the first touch electrode The, and the second touch electrode RE, and is not limited to that described above.

The contact dummy CDM may include a (4-1) cut CUT41 overlapping the gap between the first and second touch electrodes TE and RE when viewed from the top. A part of the contact dummy CDM may be connected to the first touch electrode TE of the first and second touch electrodes TE and RE facing each other directly, and another part of the contact dummy CDM may be connected to the second touch electrode RE of the first and second touch electrodes TE and RE facing each other directly. As the contact dummy CDM includes the (4-1) cut CUT41, it is possible to prevent coupling between the first touch electrodes TE and the second touch electrodes RE. For example, the (4-1) cut CUT41 of the contact dummy CDM may be located at the shortest distance from, or directly next to, the (3-1) cut CUT31 of the third sub-dummy DM3. The length of the (3-1) cut CUT31 may be larger than the length of the (4-1) cut CUT41 of the contact dummy CDM. It is, however, to be understood that the present disclosure is not limited thereto. An imaginary straight line connecting the (4-1) cut CUT41 of the contact dummy CDM with the (3-1) cut CUT31 of the third sub-dummy DM3 may pass through the center CP of the transmissive area TA. It is, however, to be understood that the present disclosure is not limited thereto.

The contact dummy CDM may be removed from a region where the dummies DM and the electrode dummy EDM directly face each other. In FIG. 8, the lower right side of the dummies DM may directly face the electrode dummy EDM. In such case, one end of the contact dummy CDM may be located between the first touch electrode TE and the electrode dummy EDM directly facing each other, and the other end of the contact dummy CDM may be located between the second touch electrode RE and the electrode dummy EDM directly facing each other. An end CDMa of the contact dummy CDM may be located in line with the (3-2) cut CUT32 of the third sub-dummy DM3, and another end CDMb of the contact dummy CDM may be located in line with the (3-3) cut CUT33 of the third sub-dummy DM3. As the ends CDMa and CDMb of the contact dummy CDM are located in line with the (3-2) cut CUT32 and the (3-3) cut CUT33, respectively, it is possible to eliminate the possibility of the coupling between the first touch electrode TE and the second touch electrode RE (e.g., which might otherwise be possible due to the presence of the contact dummy CDM).

The contact dummy CDM may be located on the second substrate SUB2, and may be covered by the first insulating layer IL1. For example, the contact dummy CDM may be connected to the first touch electrode TE or the second touch electrode RE through a contact hole passing through the first insulating layer IL1. The contact dummy EDM may be formed as, but is not limited to, an opaque metal conductive layer.

Figure 13:
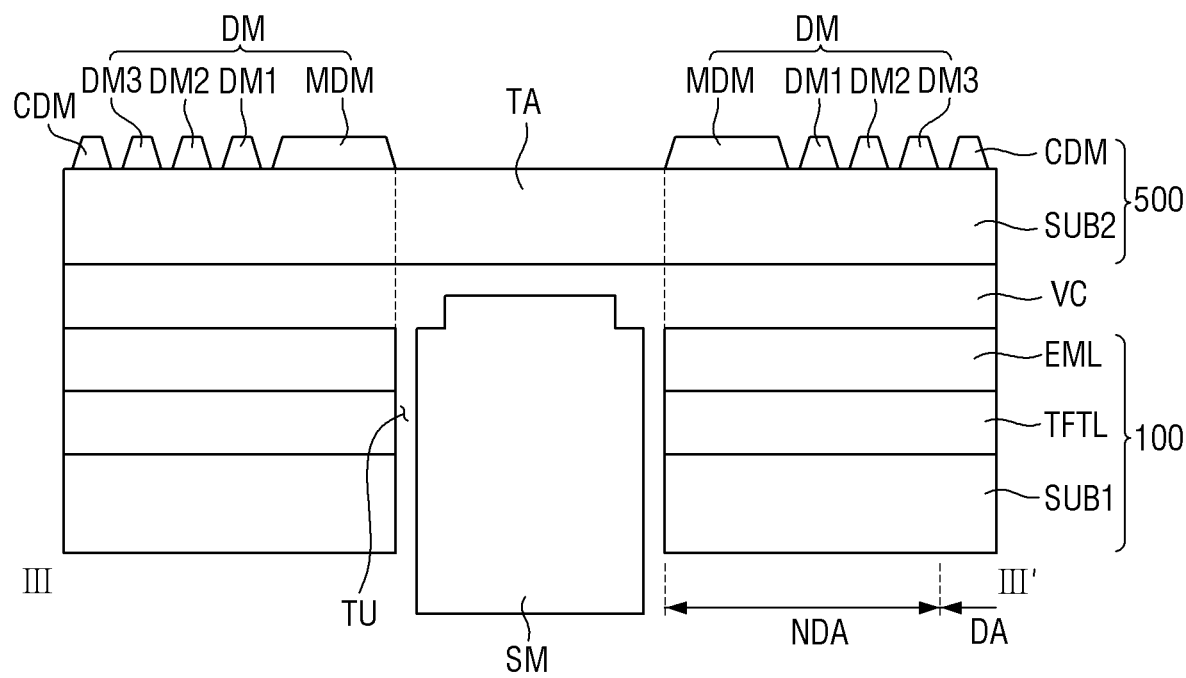
FIG. 13 shows another example of a cross-sectional view taken along the line III-III' of FIG. 8.

FIG. 13 shows another example of a cross-sectional view taken along the line III-III' of FIG. 8. The display device of FIG. 13 is substantially identical to the display device of FIG. 9, except for the configuration of the transmitting portion TU, and, therefore, redundant description thereof will be omitted.

Referring to FIG. 13, the display unit 100 may further include a non-display area NDA surrounded by a display area DA and a transmitting portion TU surrounded by the non-display area NDA. The transmitting portion TU of the display unit 100 may overlap the transmissive area TA of the touch sensing unit 500. The non-display area NDA surrounding the transmitting portion TU of the display unit 100 may overlap dummies DM of the touch sensing unit 500. The transmitting portion TU may be formed by removing portions of the display unit 100 that corresponds to the transmissive area TA of the touch sensing unit 500. For example, the transmitting portion TU may be formed by removing portions of the first substrate SUB1, the thin-film transistor layer TFTL, and the emission material layer EML that would otherwise fall in the transmissive area TA. The transmitting portion TU may accommodate at least a part of the camera module or sensor module SM. Accordingly, the display device 10 may improve the sensitivity of the camera module or sensor module SM by reducing the layers overlapping the camera module or sensor module SM.

Figure 14:
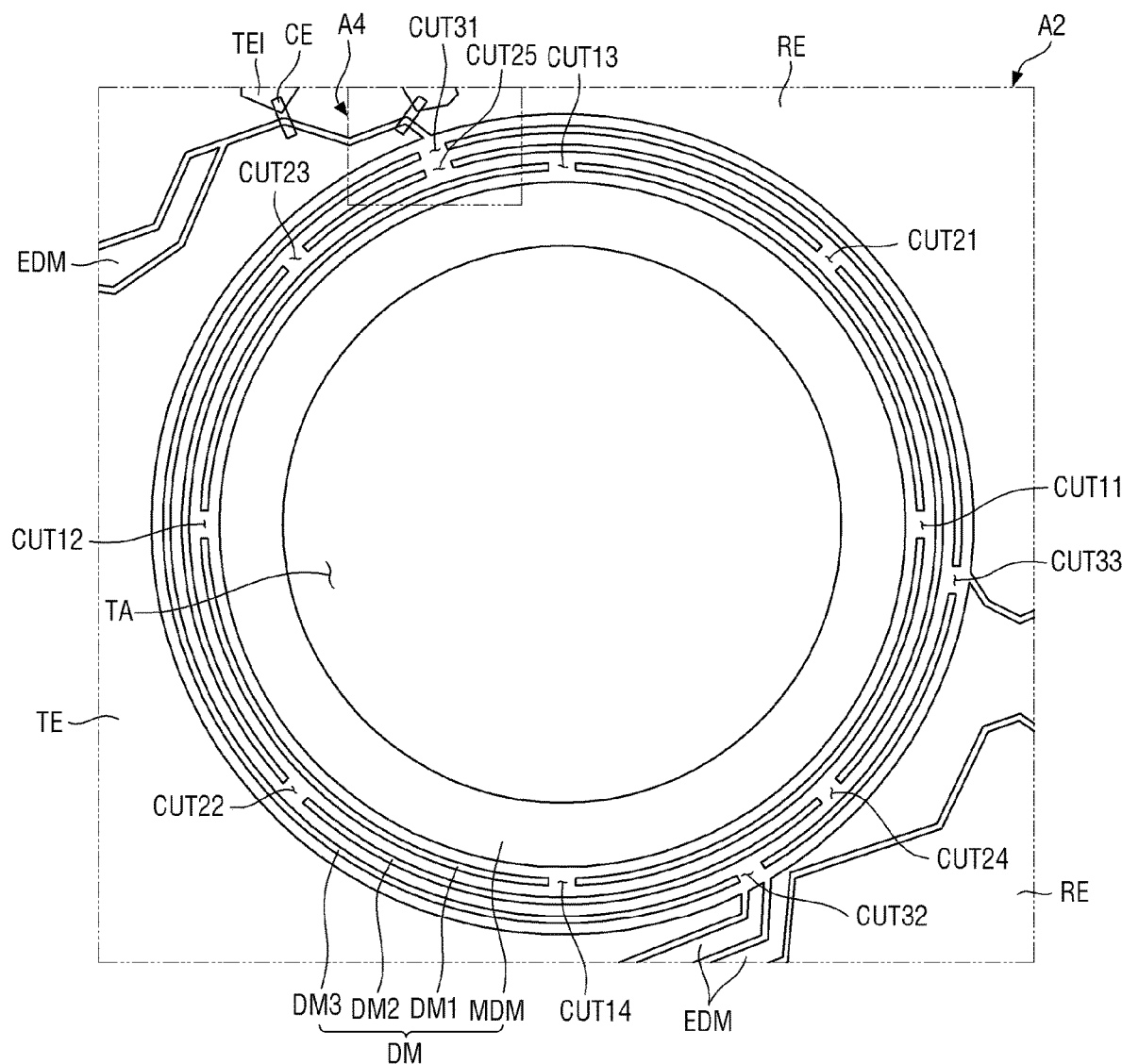
FIG. 14 is an enlarged plan view showing another example of the area A2 of FIG. 5.
Figure 15:
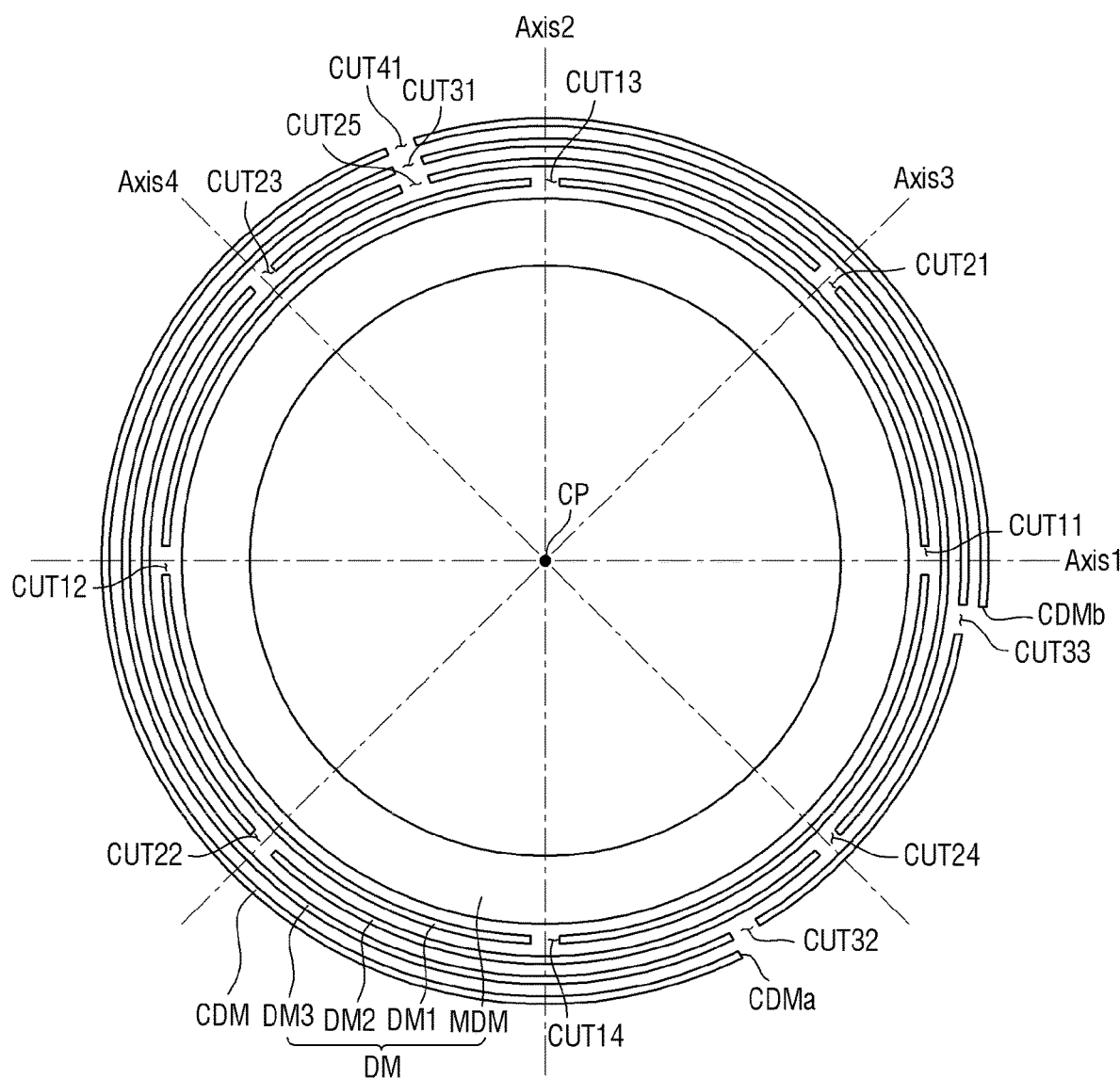
FIG. 15 is a view showing the dummies and the contact dummy shown in FIG. 14.

FIG. 14 is an enlarged plan view showing another example of the area A2 of FIG. 5, FIG. 15 is a view showing the dummies and the contact dummy shown in FIG. 14, FIG.

Figure 16:
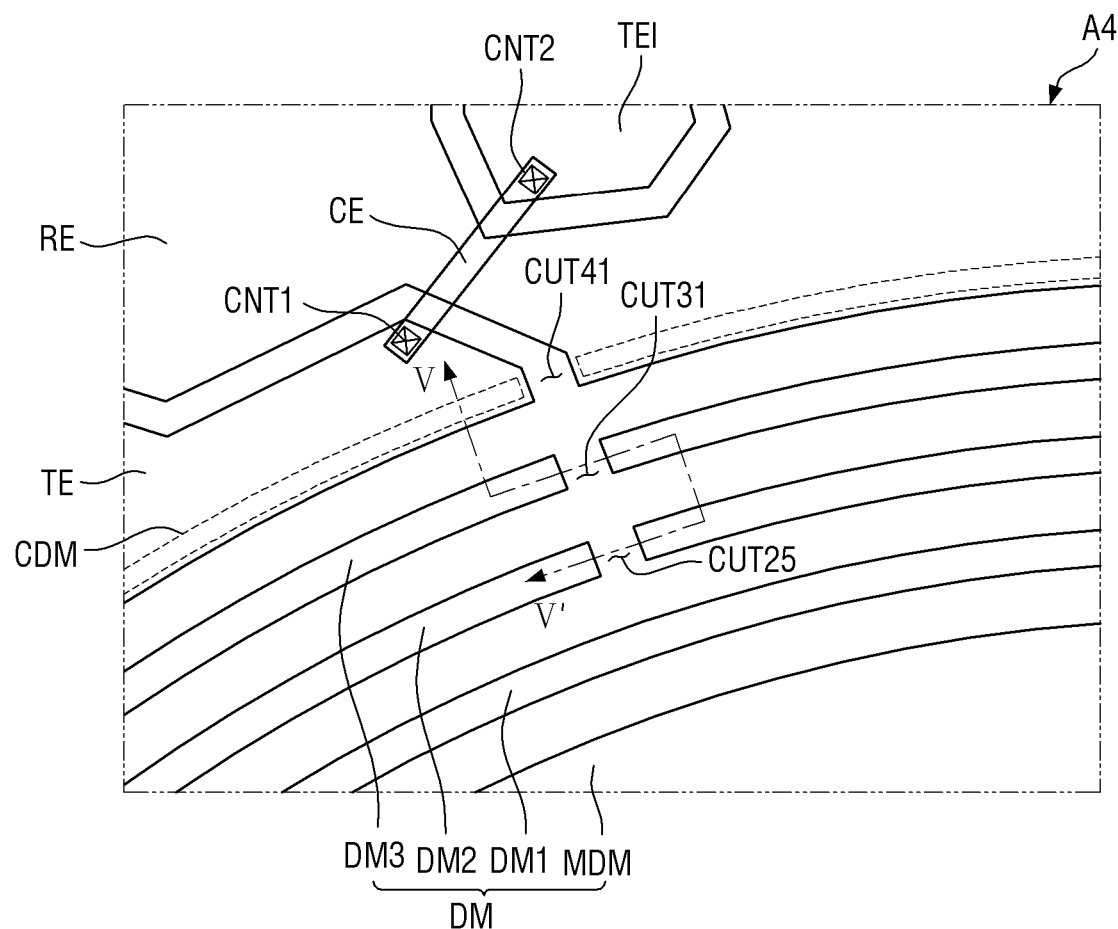
FIG. 16 is an enlarged plan view of the area A4 of FIG. 14.
Figure 17:
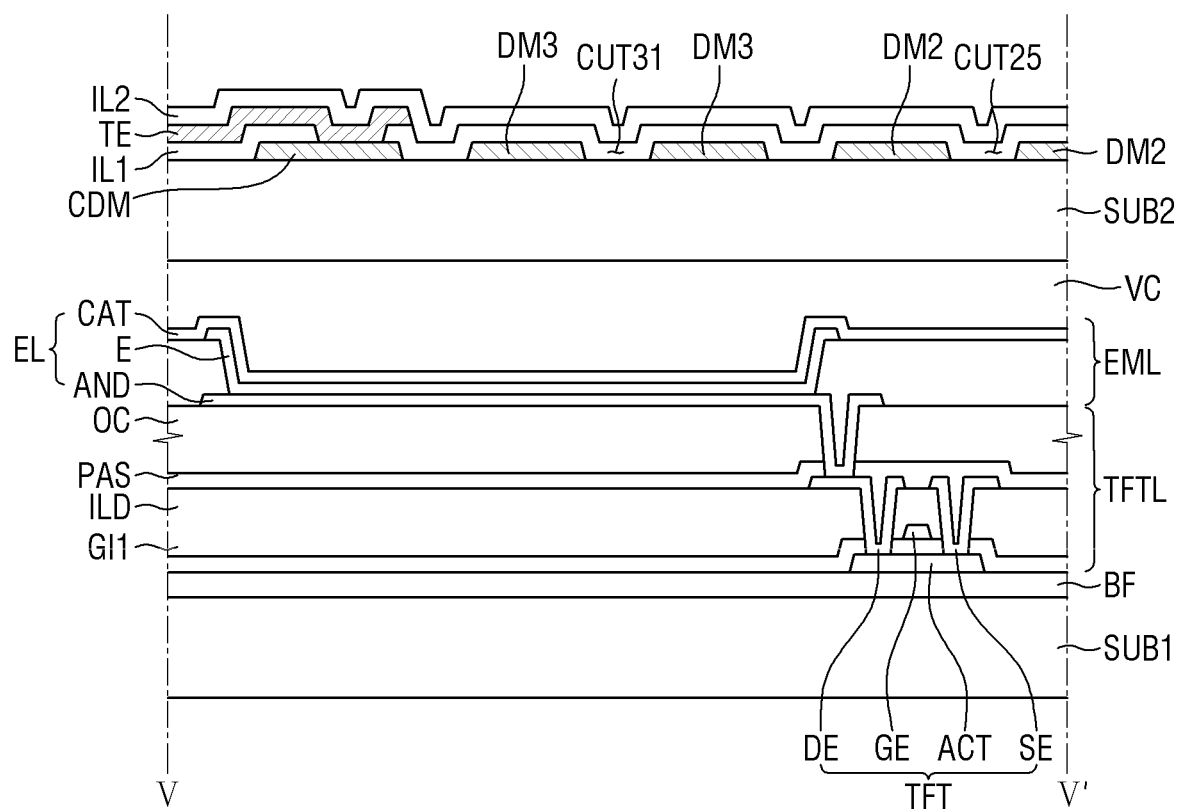
FIG. 17 is a cross-sectional view taken along the line V-V' of FIG. 16.

16 is an enlarged plan view of the area A4 of FIG. 14, and FIG. 17 is a cross-sectional view taken along the line V-V' of FIG. 16. A touch sensing unit 500 of FIGS. 14 to 17 is substantially identical to the touch sensing unit 500 shown in FIGS. 8 to 12 except that the touch sensing unit 500 further includes a (2-5) cut CUT25, and, therefore, redundant description thereof will be omitted.

Referring to FIGS. 14 to 17, the touch sensor layer TSL may include first touch electrodes TE, second touch electrodes RE, an electrode dummy EDM, a transmissive area TA, and dummies DM, and a contact dummy CDM.

The dummies DM may include a main dummy MDM directly surrounding the transmissive area TA, and at least one sub-dummy surrounding the main dummy MDM. For example, the dummy part DM may include the main dummy MDM and the first to third subsidiary dummies DM1, DM2, and DM3. It is to be noted that the number of the subsidiary dummies is not limited to three.

The main dummy MDM directly surrounds the transmissive area TA, thereby blocking external noise through the transmissive area TA. For example, the main dummy MDM may have a circular shape having a predetermined thickness when viewed from the top. The thickness of the main dummy MDM may be greater than the sum of the thicknesses of the first to third subsidiary dummies DM1, DM2, and DM3 when viewed from the top. Therefore, the main dummy MDM has a predetermined thickness, so that external noise through the transmissive area TA may be efficiently removed.

The first sub-dummy DM1 may surround the main dummy MDM, the second sub-dummy DM2 may surround the first sub-dummy DM1, and the third sub-dummy DM3 may surround the second sub-dummy DM2. The third sub-dummy DM3 may be located at the outermost position of the dummies DM. At least one of the first touch electrodes TE and at least one of the second touch electrodes RE may be partially removed depending on the positions of the transmissive area TA and the dummies DM, and may face each other directly. In addition, the third sub-dummy DM3 may directly face the partially removed first touch electrode and the second touch electrode when viewed from the top.

The first sub-dummy DM1 may include a (1-1) cut CUT11 and a (1-2) cut CUT12 overlapping a first axis Axis1 extended in the first direction (x-axis direction) passing through the center CP of the transmissive area TA. The first sub-dummy DM1 may include a (1-3) cut CUT13 and a (1-4) cut CUT14 overlapping a second axis Axis2 extended in the second direction (y-axis direction) passing through the center CP of the transmissive area TA. As the first sub-dummy DM1 includes the (1-1) cut CUT11, the (1-2) cut CUT12, the (1-3) cut CUT13, and the (1-4) cut CUT14, it is possible to prevent unwanted coupling through the first sub-dummy DM1.

The second sub-dummy DM2 may include a (2-1) cut CUT21 and a (2-2) cut CUT22 overlapping a third axis Axis3 extended in the third direction (e.g., a diagonal direction in a plan view) between the first direction (x-axis direction) and the second direction (y-axis direction) passing through the center CP of the transmissive area TA. The second sub-dummy DM2 may include a (2-3) cut CUT23 and a (2-4) cut CUT24 overlapping a fourth axis Axis4 extended in the fourth direction (e.g., a different diagonal direction in a plan view) between the opposite direction to the first direction (x-axis direction) and the second direction (y-axis direction) passing through the center CP of the transmissive area TA. As the second sub-dummy DM2 includes the (2-1) cut CUT11, the (2-2) cut CUT12, the (2-3) cut CUT13 and the (2-4) cut CUT24, it is possible to prevent the coupling through the second sub-dummy DM2.

The second sub-dummy DM2 may further include a (2-5) cut CUT25 in line with, or aligned with, the (3-1) cut CUT31. The (2-5) cut CUT25 may be located at the shortest distance from, or directly next to, the (3-1) cut CUT31. The (2-5) cut CUT25 may be formed by cutting a part of the second sub-dummy DM2 in line with the (3-1) cut CUT31. Therefore, both ends of the second sub-dummy DM2 may be insulated from each other at the (2-5) cut CUT25 therebetween. For example, the gap between the directly adjacent first and second touch electrodes TE and RE, the (3-1) cut CUT31, and the (2-5) cut CUT25 may be located on a straight line.

As the third sub-dummy DM3 includes the (3-1) cut CUT31, a part of the third sub-dummy DM3 directly facing the first touch electrode TE may be insulated from another part of the third sub-dummy DM3 directly facing the second touch electrode RE. In addition, as the second sub-dummy DM2 includes the (2-5) cut CUT25, a part of the second sub-dummy DM2 in line with a part of the third sub-dummy DM3 may be insulated from another part of the second sub-dummy DM2 in line with another part of the third sub-dummy DM3. As the third sub-dummy DM3 includes the (3-1) cut CUT31 and the second sub-dummy DM2 includes the (2-5) cut CUT25, it is possible to eliminate the possibility of the coupling between the first touch electrode TE and the second touch electrode RE.

The sub-dummy DM3 located at the outermost position of the dummies DM may further include a (3-2) cut CUT32 and a (3-3) cut CUT33 corresponding to a gap between directly adjacent electrode dummy EDM and a first touch electrode and to a gap between directly adjacent electrode dummy EDM and a second touch electrode. In FIG. 14, the lower right side of the dummies DM may directly face the electrode dummy EDM. The first touch electrode TE may be spaced apart from the second touch electrode RE by a distance that is equal to a distance between the dummies DM and the electrode dummy EDM at an area where the dummies DM and the electrode dummy EDM face each other directly. Therefore, the (3-2) cut CUT32 of the third sub-dummy DM3 may be located between the first touch electrode TE and the electrode dummy EDM directly facing each other, and the (3-3) cut CUT33 may be located between the second touch electrode RE and the electrode dummy EDM directly facing each other. As the third sub-dummy DM3 includes the (3-2) cut CUT32 and the (3-3) cut CUT33, a part of the third sub-dummy DM3 directly facing the first touch electrode TE may be insulated from another part of the third sub-dummy DM3 directly facing the second touch electrode RE. As the third sub-dummy DM3 includes the (3-2) cut CUT32 and the (3-3) cut CUT33, it is possible to eliminate the possibility of the coupling between the first touch electrode TE and the second touch electrode RE due to the third-sub-dummy DM3.

For example, the (4-1) cut CUT41 of the contact dummy CDM may be located at the shortest distance from the (3-1) cut CUT31 of the third sub-dummy DM3. In addition, the (4-1) cut CUT41 of the contact dummy CDM may be located at the shortest distance from the (2-5) cut CUT25 of the second sub-dummy DM2. An imaginary straight line connecting the (4-1) cut CUT41 of the contact dummy CDM, the (3-1) cut CUT31 of the third sub-dummy DM3, and the (2-5) cut CUT25 of the second sub-dummy DM2 may pass through the center CP of the transmissive area TA. It is, however, to be understood that the present disclosure is not limited thereto.

Figure 18:
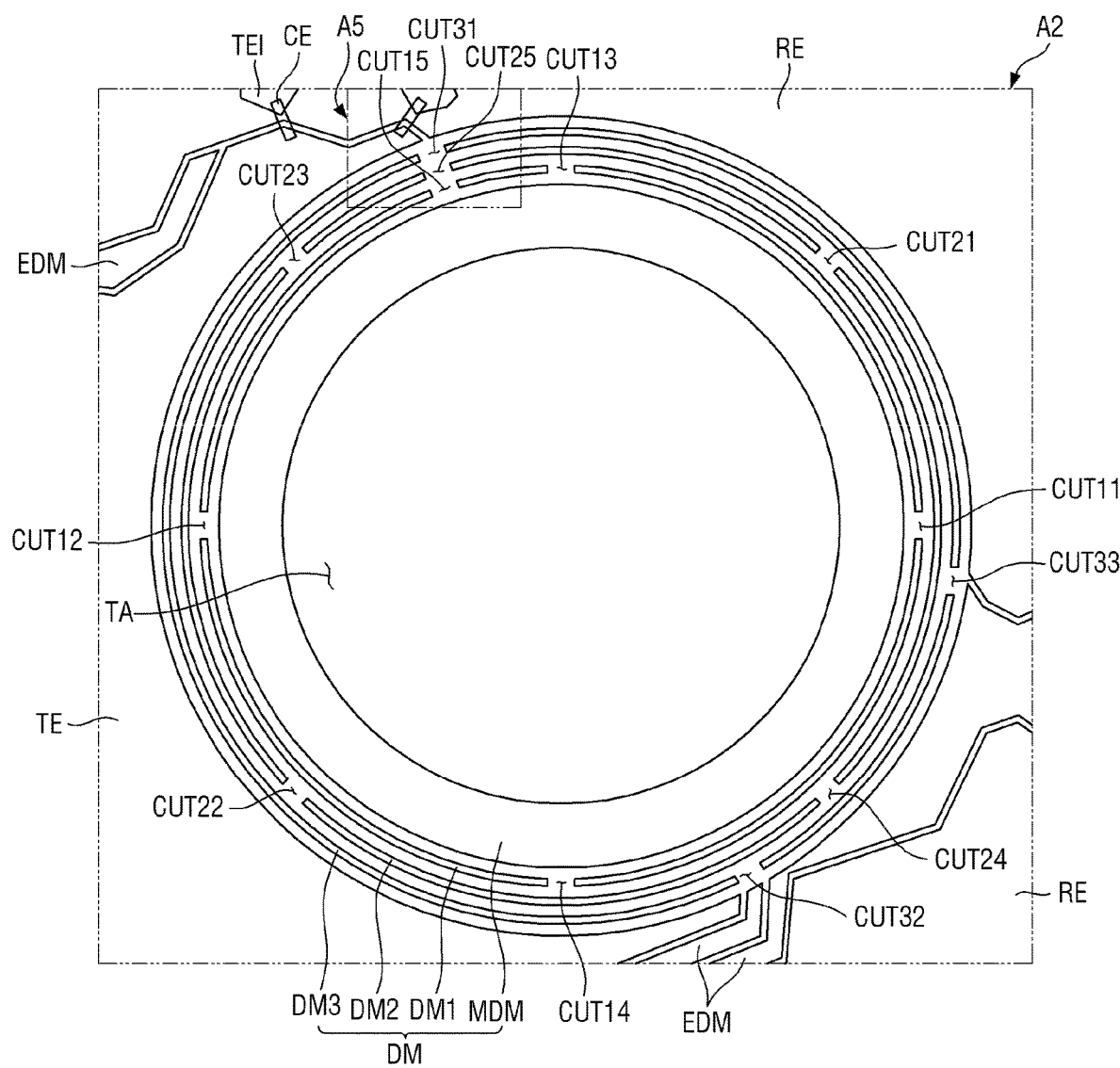
FIG. 18 is an enlarged plan view showing yet another example of the area A2 of FIG. 5.
Figure 19:
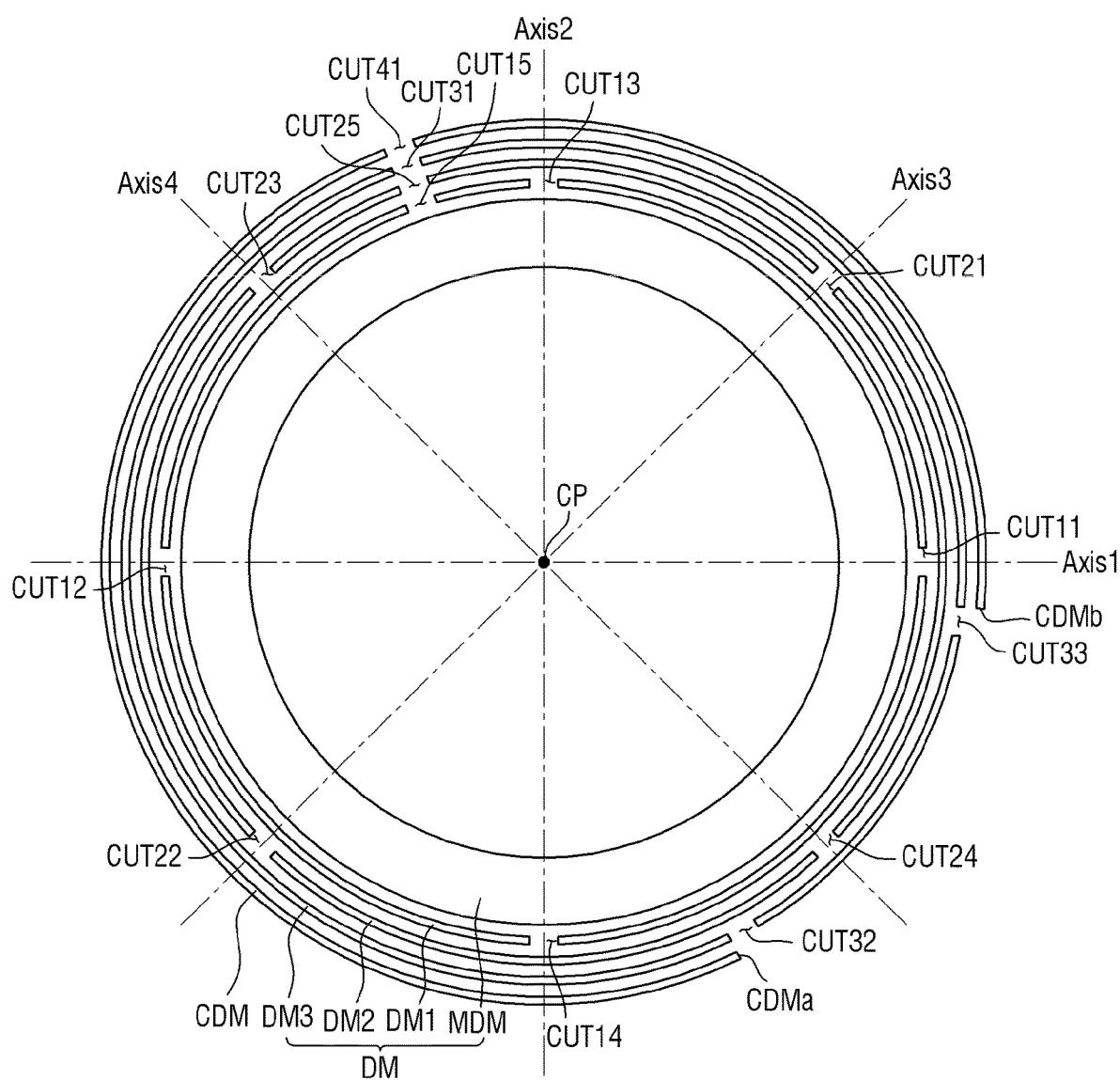
FIG. 19 is a view showing the dummies and the contact dummy shown in FIG. 18.
Figure 20:
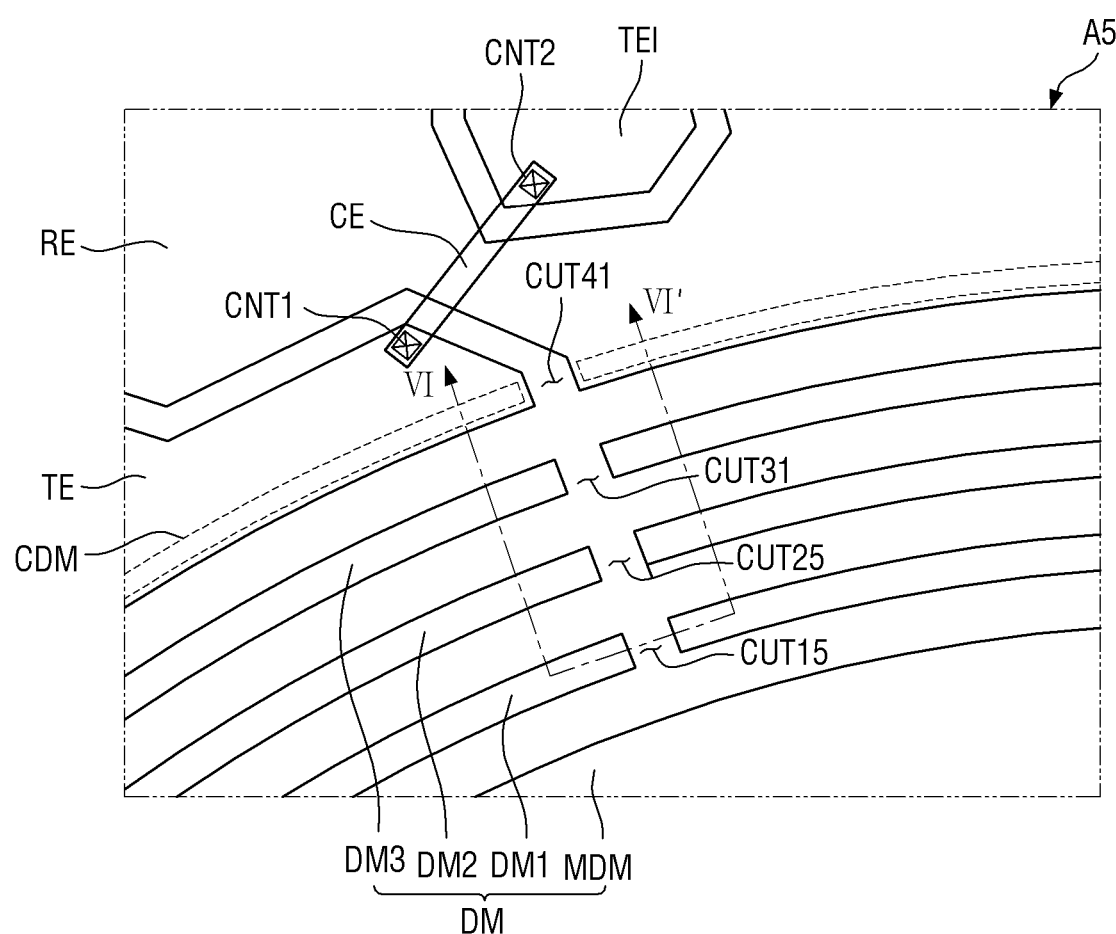
FIG. 20 is an enlarged plan view of the area A5 of FIG. 18.
Figure 21:
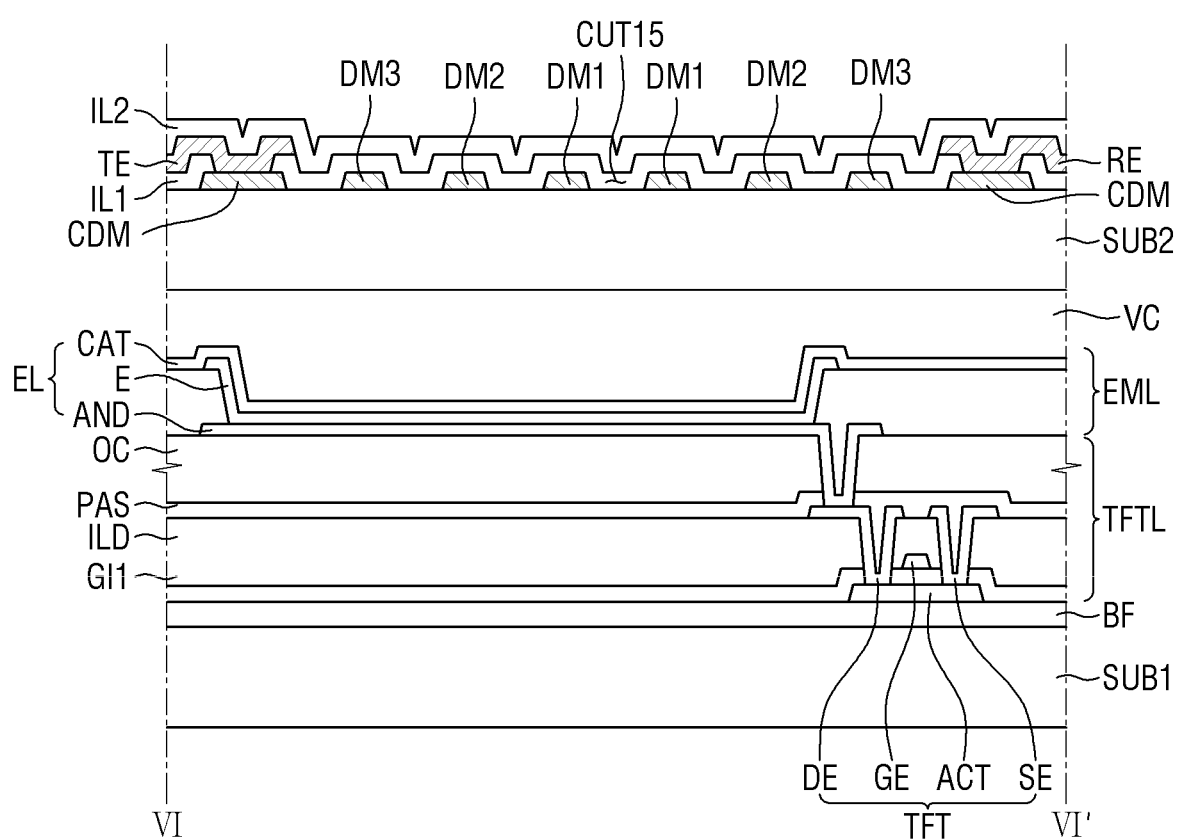
FIG. 21 is a cross-sectional view taken along the line VI-VI' of FIG. 20.

FIG. 18 is an enlarged plan view showing yet another example of the area A2 of FIG. 5, FIG. 19 is a view showing the dummies and the contact dummy shown in FIG. 18, FIG. 20 is an enlarged plan view of the area A5 of FIG. 18, and FIG. 21 is a cross-sectional view taken along the line VI-VI' of FIG. 20. A touch sensing unit 500 of FIGS. 18 to 21 is substantially identical to the touch sensing unit 500 shown in FIGS. 14 to 17 except that the touch sensing unit 500 shown in FIGS. 14 to 17 further includes a (1-5) cut CUT15, and, therefore, redundant description thereof will be omitted.

Referring to FIGS. 18 to 21, the touch sensor layer TSL may include first touch electrodes TE, second touch electrodes RE, an electrode dummy EDM, a transmissive area TA, and dummies DM, and a contact dummy CDM.

The dummies DM may include a main dummy MDM directly surrounding the transmissive area TA and at least one sub-dummy surrounding the main dummy MDM. For example, the dummy part DM may include the main dummy MDM and the first to third subsidiary dummies DM1, DM2, and DM3. It is to be noted that the number of the subsidiary dummies is not limited to three.

The first sub-dummy DM1 may surround the main dummy MDM, the second sub-dummy DM2 may surround the first sub-dummy DM1, and the third sub-dummy DM3 may surround the second sub-dummy DM2. The third sub-dummy DM3 may be located at the outermost position of the dummies DM. At least one of the first touch electrodes TE and at least one of the second touch electrodes RE may be partially removed depending on the positions of the transmissive area TA and the dummies DM. The partially removed first touch electrode and the second touch electrode may face each other directly. In addition, the third sub-dummy DM3 may directly face the partially removed first touch electrode and the second touch electrode when viewed from the top.

The first sub-dummy DM1 may include a (1-1) cut CUT11 and a (1-2) cut CUT12 overlapping a first axis Axis1 extended in the first direction (x-axis direction) passing through the center CP of the transmissive area TA. The first sub-dummy DM1 may include a (1-3) cut CUT13 and a (1-4) cut CUT14 overlapping a second axis Axis2 extended in the second direction (y-axis direction) passing through the center CP of the transmissive area TA. As the first sub-dummy DM1 includes the (1-1) cut CUT11, the (1-2) cut CUT12, the (1-3) cut CUT13, and the (1-4) cut CUT14, it is possible to prevent the coupling through the first sub-dummy DM1.

The first sub-dummy DM1 may further include a (1-5) cut CUT15 in line with the (2-5) cut CUT25. The (1-5) cut CUT15 may be located at the shortest distance from the (3-1) cut CUT31 or the (2-5) cut CUT25. The (1-5) cut CUT25 may be formed by cutting a part of the first sub-dummy DM1 in line with the (2-5) cut CUT25. Therefore, both ends of the first sub-dummy DM1 may be insulated from each other at the (1-5) cut CUT15 therebetween. For example, the gap between the directly adjacent first and second touch electrodes TE and RE, the (3-1) cut CUT31, the (2-5) cut CUT25, and the (1-5) cut CUT15 may be located on a straight line.

The second sub-dummy DM2 may include a (2-1) cut CUT21 and a (2-2) cut CUT22 overlapping a third axis Axis3 extended in the third direction (e.g., a diagonal direction in a plan view) between the first direction (x-axis direction) and the second direction (y-axis direction) passing through the center CP of the transmissive area TA. The second sub-dummy DM2 may include a (2-3) cut CUT23 and a (2-4) cut CUT24 overlapping a fourth axis Axis4 extended in the fourth direction (e.g., a different diagonal direction) between the opposite direction to the first direction (x-axis direction) and the second direction (y-axis direction) passing through the center CP of the transmissive area TA. As the second sub-dummy DM2 includes the (2-1) cut CUT11, the (2-2) cut CUT12, the (2-3) cut CUT13 and the (2-4) cut CUT24, it is possible to prevent the coupling through the second sub-dummy DM2.

The second sub-dummy DM2 may further include a (2-5) cut CUT25 in line with the (3-1) cut CUT31. The (2-5) cut CUT25 may be located at the shortest distance from the (3-1) cut CUT31. The (2-5) cut CUT25 may be formed by cutting a part of the second sub-dummy DM2 in line with the (3-1) cut CUT31. Therefore, both ends of the second sub-dummy DM3 may be insulated from each other at the (2-5) cut CUT25 therebetween. For example, the gap between the directly adjacent first and second touch electrodes TE and RE, the (3-1) cut CUT31, and the (2-5) cut CUT25 may be located on a straight line.

As the third sub-dummy DM3 includes the (3-1) cut CUT31, a part of the third sub-dummy DM3 directly facing the first touch electrode TE may be insulated from another part of the third sub-dummy DM3 directly facing the second touch electrode RE. In addition, as the second sub-dummy DM2 includes the (2-5) cut CUT25, a part of the second sub-dummy DM2 in line with the third sub-dummy DM3 may be insulated from another part of the second sub-dummy DM2 in line with another part of the third sub-dummy DM3. As the third sub-dummy DM3 includes the (3-1) cut CUT31 and the second sub-dummy DM2 includes the (2-5) cut CUT25, it is possible to eliminate the possibility of the coupling between the first touch electrode TE and the second touch electrode RE.

The sub-dummy DM3 located at the outermost position of the dummies DM may further include a (3-2) cut CUT32 and a (3-3) current CUT33 corresponding to a gap between directly adjacent electrode dummy EDM and a first touch electrode or a second touch electrode among the first and second touch electrodes TE and RE. In FIG. 18, the lower right side of the dummies DM may directly face the electrode dummy EDM. The first touch electrode TE spaced apart from the second touch electrode RE by the distance that is equal to the distance between the dummies DM and the electrode dummy EDM facing each other directly. Therefore, the (3-2) cut CUT32 of the third sub-dummy DM3 may be located between the first touch electrode TE and the electrode dummy EDM directly facing each other, and the (3-3) cut CUT33 may be located between the second touch electrode RE and the electrode dummy EDM directly facing each other. As the third sub-dummy DM3 includes the (3-2) cut CUT32 and the (3-3) cut CUT33, a part of the third sub-dummy DM3 directly facing the first touch electrode TE may be insulated from another part of the third sub-dummy DM3 directly facing the second touch electrode RE. As the third sub-dummy DM3 includes the (3-2) cut CUT32 and the (3-3) cut CUT33, it is possible to eliminate the possibility of the coupling between the first touch electrode TE and the second touch electrode RE.

For example, the (4-1) cut CUT41 of the contact dummy CDM may be located at the shortest distance from the (3-1) cut CUT31 of the third sub-dummy DM3. In addition, the (4-1) cut CUT41 of the contact dummy CDM may be located at the shortest distance from the (2-5) cut CUT25 of the second sub-dummy DM2 or the (1-5) cut of the first sub-dummy DM1. An imaginary straight line connecting the (4-1) cut CUT41 of the contact dummy CDM, the (3-1) cut CUT31 of the third sub-dummy DM3, the (2-5) cut CUT25 of the second sub-dummy DM2 and the (1-5) cut CUT15 of the first sub-dummy DM1 may pass through the center CP of the transmissive area TA. It is, however, to be understood that the present disclosure is not limited thereto.

Figure 22:
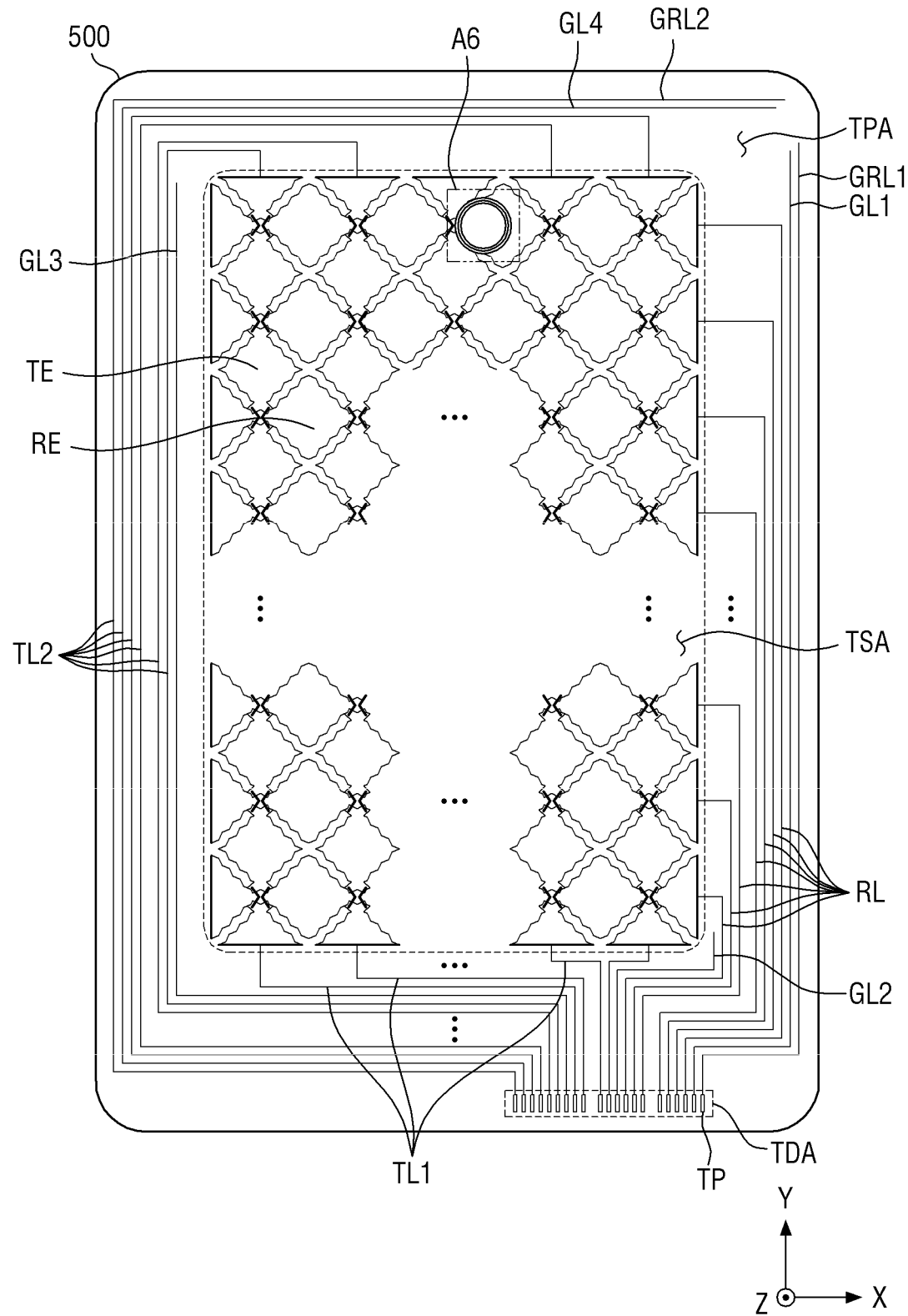
FIG. 22 is a plan view showing another example of the touch sensing unit shown in FIG. 3A.
Figure 23:
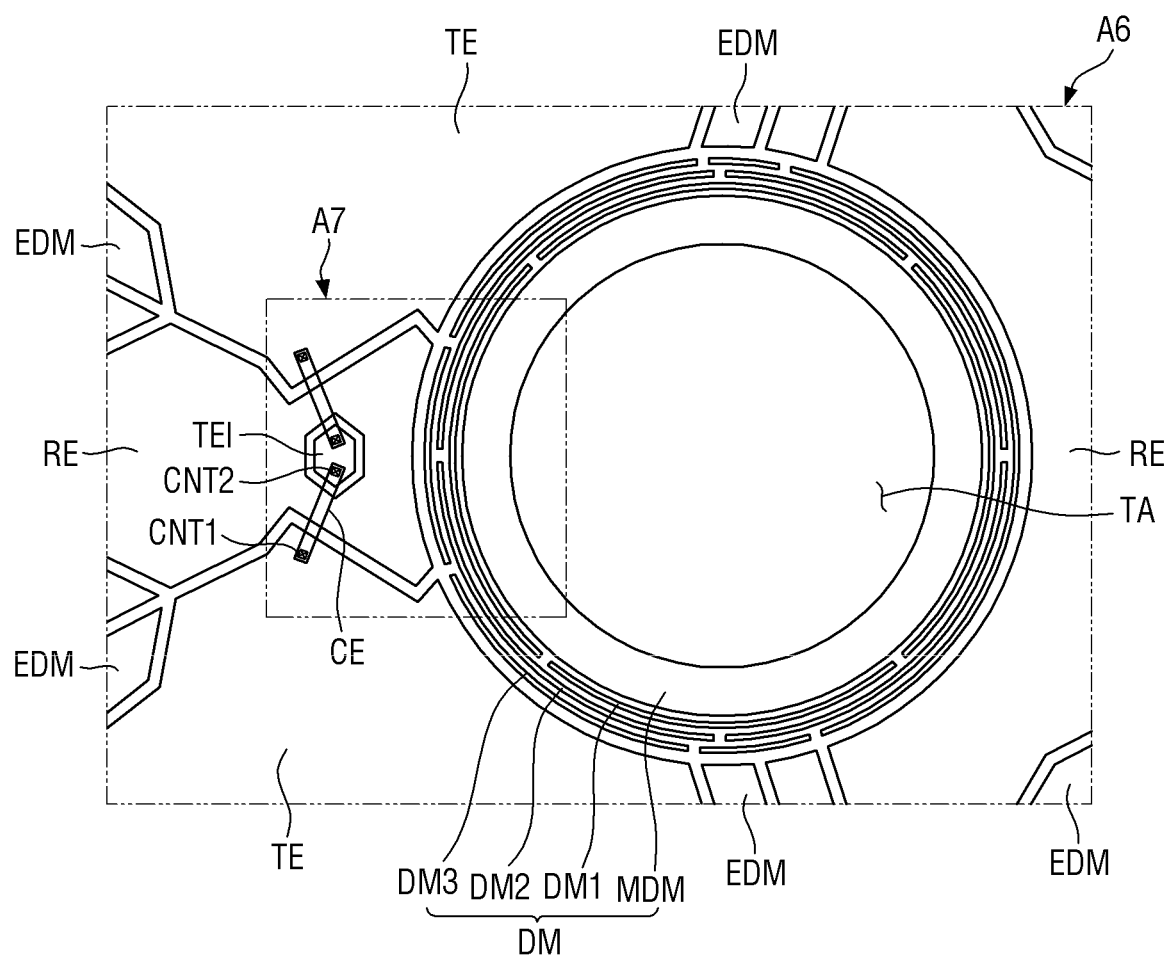
FIG. 23 is an enlarged plan view of the area A6 of FIG. 22.
Figure 24:
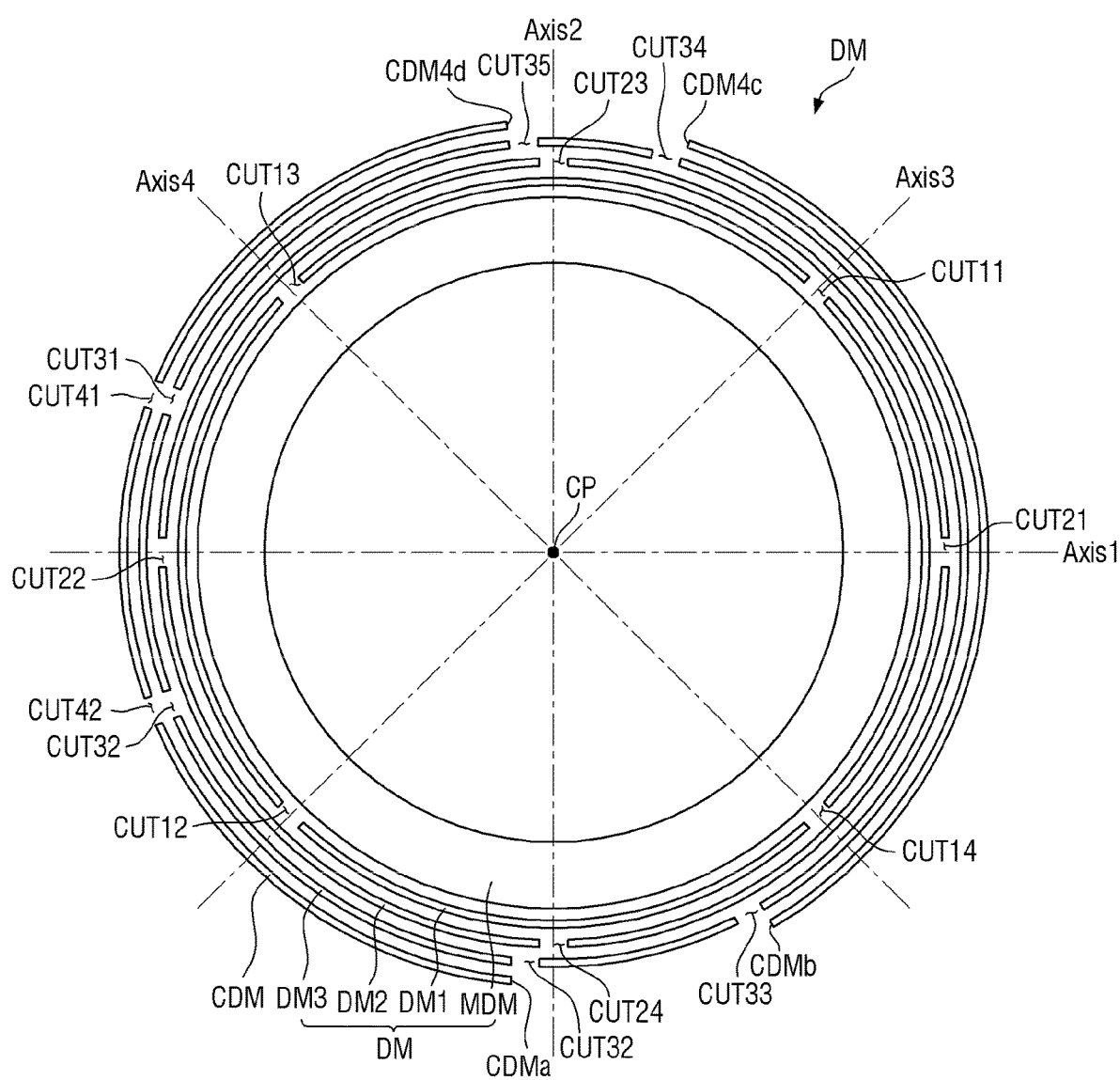
FIG. 24 is a view showing the dummies and the contact dummy shown in FIG. 23.
Figure 25:
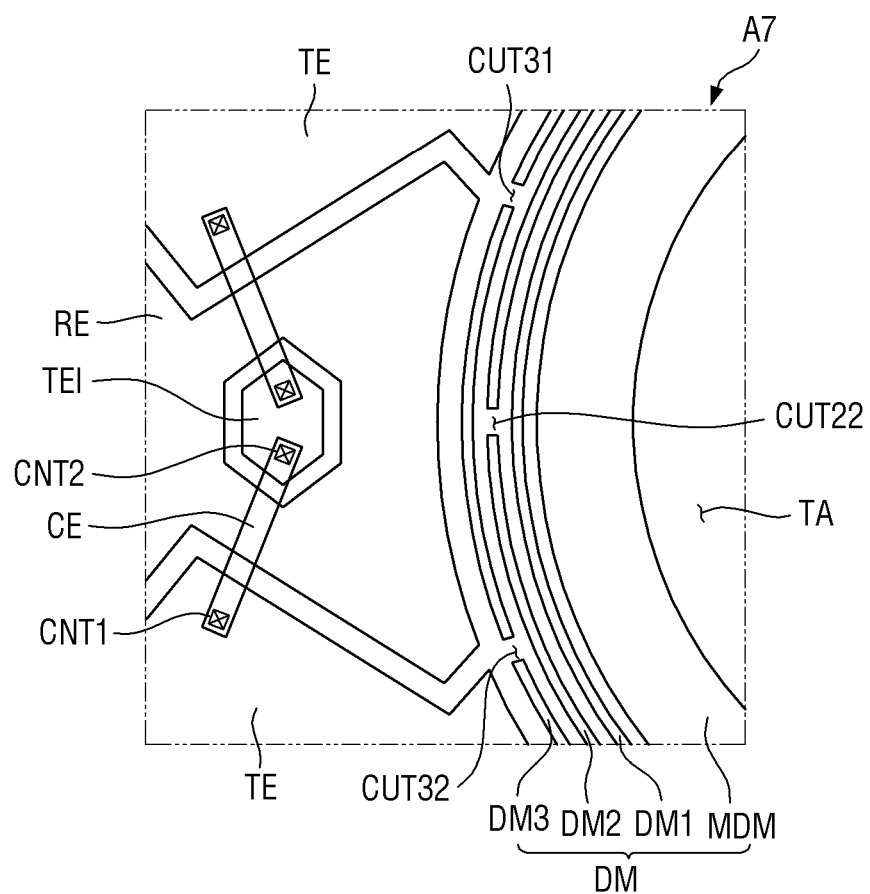
FIG. 25 is an enlarged plan view of the area A7 of FIG. 23.

FIG. 22 is a plan view showing another example of the touch sensing unit shown in FIG. 3A, FIG. 23 is an enlarged plan view of the area A6 of FIG. 22, FIG. 24 is a view showing the dummies and the contact dummy shown in FIG. 23, and FIG. 25 is an enlarged plan view of the area A7 of FIG. 23. The touch sensing unit FIGS. 22 to 25 is substantially identical to the above-described touch sensing unit except for the location of a transmissive area, and, therefore, redundant description thereof will be omitted.

Referring to FIGS. 22 to 25, the transmissive area TA may be surrounded by at least one of the first touch electrodes TE and at least one of the second touch electrodes RE in the touch sensor area TSA. For example, the transmissive area TA may overlap the transmitting portion TU of the display unit 100. In FIGS. 22 and 23, the transmissive area TA may be surrounded by two first touch electrodes TE and one second touch electrode RE. Accordingly, there may be several regions where the first and second touch electrodes TE and RE face each other directly depending on the positions of the transmissive area TA and the dummies DM.

The dummies DM may include a main dummy MDM directly surrounding the transmissive area TA, and at least one sub-dummy surrounding the main dummy MDM. For example, the dummy part DM may include the main dummy MDM and the first to third subsidiary dummies DM1, DM2, and DM3. It is to be noted that the number of the subsidiary dummies is not limited to three.

In FIG. 24, the locations of a (1-1) cut CUT11, a (1-2) cut CUT12, a (1-3) cut CUT13 and a (1-4) cut CUT14 of the first sub-dummy DM1 may correspond to the locations of the (2-1) cut CUT21, the (2-2) cut CUT22, the (2-3) cut CUT23, and the (2-4) cut CUT24 of the second sub-dummy DM2 shown in FIG. 8. In FIG. 24, the locations of a (2-1) cut CUT21, a (2-2) cut CUT22, a (2-3) cut CUT23, and a (2-4) cut CUT24 of the second sub-dummy DM2 may correspond to the locations of the (1-1) cut CUT11, the (1-2) cut CUT12, the (1-3) cut CUT13, and the (1-4) cut CUT14 of the first sub-dummy DM1 shown in FIG. 8. Therefore, the first and second sub-dummy DM1 and DM2 include the number of cuts, thereby preventing coupling through the first and second sub-dummy DM1 and DM2.

In the area A7 of FIG. 25, the third sub-dummy DM3 may include a (3-1) cut CUT31 corresponding to the gap between a pair of first and second touch electrodes TE and RE facing each other directly. The third sub-dummy DM3 may include a (3-2) cut CUT32 corresponding to the gap between another pair of first and second touch electrodes TE and RE facing each other directly. The (3-1) cut CUT31 and the (3-2) cut CUT32 may achieve the same configuration and effects as the (3-1) cut CUT31 described above with reference to FIGS. 8 to 12. As such, the configuration of the cuts formed in the sub-dummy DM3 located at the outermost portion of the dummies DM may be altered depending on the configurations of the transmission area TA, the dummies DM, and first and second touch electrodes TE and RE.

As described above, the sub-dummy DM3 located at the outermost portion of the dummies DM includes at least one cut in line with the gap between the directly adjacent first and second touch electrodes TE and RE, and thus a part of the dummies DM associated with the first touch electrode TE may be insulated from another part of the dummies DM associated with the second touch electrode RE. Accordingly, it is possible to prevent undesirable coupling between the first and second touch electrodes TE and RE even if unintended coupling occurs between the first touch electrodes TE and the dummies DM or between the second touch electrodes RE and the dummies DM. Accordingly, the sensitivity and reliability of the touch sensing unit 500 of the display device 10 may be improved.

Although described with reference to some embodiments of the present disclosure, it will be understood that various changes and modifications of the present disclosure may be made by one ordinary skilled in the art or one having ordinary knowledge in the art without departing from the spirit and technical field of the present disclosure as hereinafter claimed. Hence, the technical scope of the present disclosure is not limited to the detailed descriptions in the specification but should be determined only with reference to the claims, with functional equivalents thereof to be included therein.

What is claimed is:

1. A display device comprising:
    a display unit comprising a display area having a plurality of pixels, a transmitting portion surrounded by the display area, and a non-display area surrounding the display area; and
    a touch sensing unit having a transmissive area overlapping the transmitting portion, dummies surrounding the transmissive area, and a touch sensor area surrounding the dummies and comprising:
        first touch electrodes arranged in a first direction and a second direction perpendicular to the first direction; and
        second touch electrodes respectively between the first touch electrodes, connected in the first direction, and spaced apart from one another in the second direction,
    wherein the dummies comprise a first dummy surrounding the transmissive area, and a second dummy surrounding the first dummy,
    wherein the first dummy comprises a first cut overlapping a first axis passing through a center of the transmissive area, and
    wherein the second dummy is electrically connected to one of the first or second touch electrodes, and comprises a second cut that does not overlap the first axis.

2. The display device of claim 1, wherein the second cut overlaps a gap between adjacent ones of the first and second touch electrodes in a plan view.

3. The display device of claim 1, wherein the dummies further comprise a third dummy between the first dummy and the second dummy, and comprising a third cut overlapping a second axis passing through the center and intersecting the first axis.

4. The display device of claim 3, wherein the second cut does not overlap the second axis.

5. The display device of claim 3, wherein the dummies further comprise a fourth dummy between the second dummy and the third dummy, and comprising a fourth cut that does not overlap the first axis and the second axis.

6. The display device of claim 5, wherein the fourth cut is adjacent a gap between adjacent ones of the first and second touch electrodes.

7. The display device of claim 5, wherein a width of the second dummy is greater than a width of the fourth dummy in a plan view.

8. The display device of claim 5, wherein the touch sensing unit further comprises an electrode dummy between adjacent ones of the first and second touch electrodes.

9. The display device of claim 8, wherein the fourth cut is spaced apart from the electrode dummy, and
wherein one of the adjacent ones of the first and second touch electrodes is between the fourth cut and the electrode dummy.

10. The display device of claim 8, wherein the fourth dummy further comprises a fifth cut corresponding to a gap between the electrode dummy and one of the first and second touch electrodes.

11. The display device of claim 8, wherein a part of the fourth dummy is surrounded by the first dummy, and another part of the fourth dummy is surrounded by the electrode dummy.

12. The display device of claim 5, wherein the third dummy further comprises a sixth cut adjacent the fourth cut.

13. The display device of claim 12, wherein the second cut, the fourth cut, and the sixth cut are aligned in a straight imaginary line.

14. The display device of claim 12, wherein the first dummy further comprises a seventh cut adjacent the sixth cut.

15. The display device of claim 14, wherein the second cut, the fourth cut, the sixth cut, and the seventh cut are aligned in a straight imaginary line.

16. The display device of claim 1, wherein the touch sensing unit further comprises a base member supporting the dummies, and
wherein the dummies are at a layer between the base member and the first and second touch electrodes.

17. The display device of claim 16, wherein the touch sensing unit comprises:
a touch island electrode between ones of the first touch electrodes that are adjacent in the second direction; and
connection electrodes connecting the ones of the first touch electrodes that are adjacent in the second direction with the touch island electrode.

18. The display device of claim 17, wherein the touch island electrode is in a same layer as the first touch electrodes and the second touch electrodes, and
wherein the connection electrodes are in a same layer as the dummies.

19. A display device comprising:
a display unit comprising a display area having a plurality of pixels, a first non-display area surrounded by the display area, a transmitting portion surrounded by the first non-display area and having an open side, and a second non-display area surrounding the display area; and
a touch sensing unit having a transmissive area overlapping the transmitting portion, dummies overlapping the first non-display area and surrounding the transmissive area, and a touch sensor area surrounding the dummies and comprising:
a base member;
first touch electrodes arranged in a first direction, and in a second direction that is perpendicular to the first direction on the base member; and
second touch electrodes between the first touch electrodes, connected in the first direction, and spaced apart from one another in the second direction,
wherein the dummies comprise a first dummy surrounding the transmissive area, and a second dummy surrounding the first dummy,
wherein the first dummy comprises a first cut overlapping a first axis passing through a center of the transmissive area, and
wherein the second dummy is electrically connected to one of the first or second touch electrode, and comprises a second cut that does not overlapping the first axis.

20. The display device of claim 19, wherein the second cut overlaps a gap between adjacent ones of the first and second touch electrodes in a plan view.

* * * * *